(12) United States Patent
Andre et al.

(10) Patent No.: US 7,880,131 B2
(45) Date of Patent: Feb. 1, 2011

(54) INVISIBLE, LIGHT-TRANSMISSIVE DISPLAY SYSTEM

(75) Inventors: Bartley K. Andre, Menlo Park, CA (US); Daniel J. Coster, San Francisco, CA (US); Richard P. Howarth, San Francisco, CA (US); Daniele de Iuliis, San Francisco, CA (US); Jonathan P. Ive, San Francisco, CA (US); Duncan Robert Kerr, San Francisco, CA (US); Shin Nishibori, San Francisco, CA (US); Matthew Dean Rohrbach, San Francisco, CA (US); Douglas B. Satzger, Menlo Park, CA (US); Calvin Q. Seid, Palo Alto, CA (US); Christopher J. Stringer, Portola Valley, CA (US); Eugene Antony Whang, San Francisco, CA (US); Rico Zörkendörfer, San Francisco, CA (US); David Morgenstern, Palo Alto, CA (US); Paul C. L. Chow, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1136 days.

(21) Appl. No.: 11/551,988

(22) Filed: Oct. 23, 2006

(65) Prior Publication Data

US 2008/0024470 A1 Jan. 31, 2008

Related U.S. Application Data

(63) Continuation-in-part of application No. 11/456,833, filed on Jul. 11, 2006.

(51) Int. Cl.
*G09G 5/00* (2006.01)

(52) U.S. Cl. .................. 250/227.26; 345/173; 428/690; 40/580

(58) Field of Classification Search ............ 250/227.26; 345/173, 204; 428/690; 40/580
See application file for complete search history.

(56) References Cited

U.S. PATENT DOCUMENTS 5,544,020 A * 8/1996 Loeber et al. .................. 362/29

(Continued)

FOREIGN PATENT DOCUMENTS

JP 07271309 A1 10/1995

(Continued)

OTHER PUBLICATIONS

Tyrell, J., "Invisible display lights up metal," Lasers, Optics and Photonics Resources and News, Feb. 17, 2005, pp. 1-2.

(Continued)

*Primary Examiner*—Seung C Sohn
(74) *Attorney, Agent, or Firm*—Kramer Levin Naftalis & Frankel LLP

(57) ABSTRACT

An invisible, light-transmissive display system with a light resistant material is provided. Substantially invisible, tapered, light-transmissive holes are penetrated in a light-transmissive pattern through at least a portion of the light resistant material using a laser beam having a focal width less than the smallest diameter of the tapered holes.

74 Claims, 11 Drawing Sheets

U.S. PATENT DOCUMENTS

| | | | |
|---|---|---|---|
| 5,987,793 A | 11/1999 | Ebine | |
| 7,334,362 B2 * | 2/2008 | Bladt | 40/541 |
| 7,663,612 B2 * | 2/2010 | Bladt | 345/176 |
| 2004/0247935 A1 * | 12/2004 | Bladt | 428/690 |
| 2006/0066579 A1 | 3/2006 | Bladt | |

FOREIGN PATENT DOCUMENTS

| | | |
|---|---|---|
| WO | WO2004/077388 A1 | 9/2004 |
| WO | WO2008/006375 A1 | 1/2008 |

OTHER PUBLICATIONS

Prichystal, et al., "Invisible Display in Aluminum" in Proc. of SPIE vol. 5713: Photon Processing in Microelectronics and Photonics IV, Jan. 2005, pp. 215-222.

Liu et al., "Industrial applications of ultrahigh precision short-pulse laser processing" in Proc of SPIE vol. 5713: Photon Processing in Microelectronics and Photonics IV, Jan. 2005, pp. 372-386.

* cited by examiner

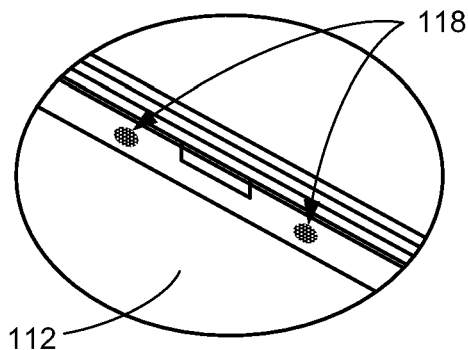
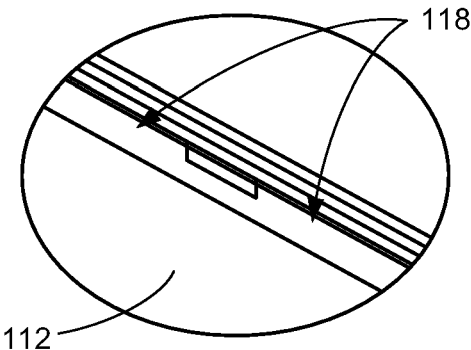
FIG. 2A  FIG. 2B
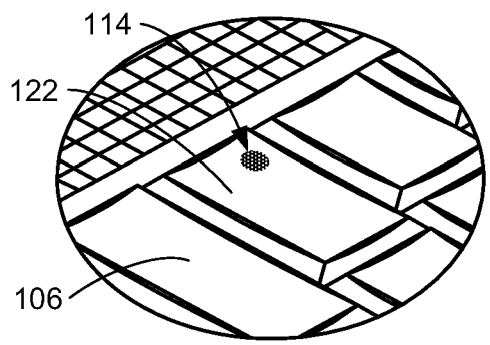
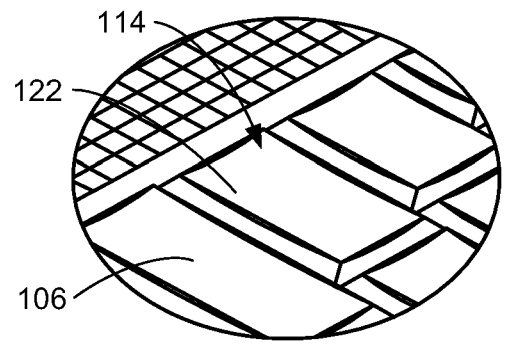
FIG. 3A  FIG. 3B
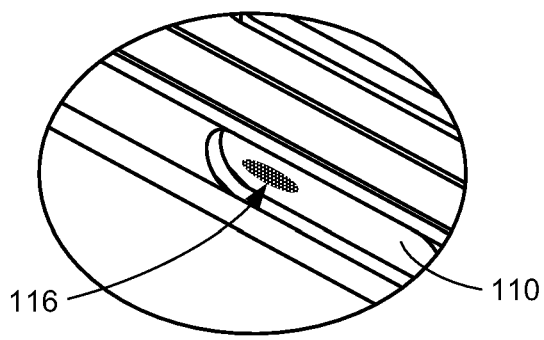
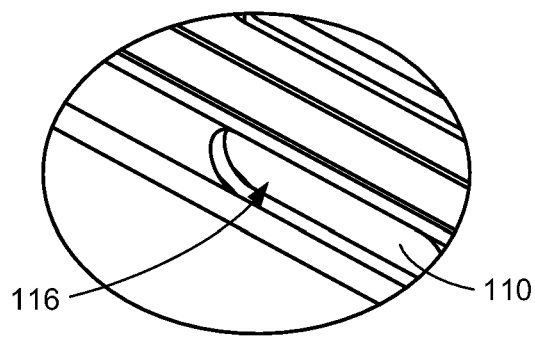
FIG. 4A  FIG. 4B

INVISIBLE, LIGHT-TRANSMISSIVE DISPLAY SYSTEM

CROSS-REFERENCE TO RELATED APPLICATION

This is a continuation-in-part of co-pending U.S. patent application Ser. No. 11/456,833 filed Jul. 11, 2006, titled "INVISIBLE, LIGHT-TRANSMISSIVE DISPLAY SYSTEM", and assigned to the assignee of the present application.

TECHNICAL FIELD

The present invention relates generally to device display systems, and more particularly to invisible, light-transmissive display systems that become visible when illuminated from behind.

BACKGROUND ART

In the world of consumer devices, and particularly consumer electronics, there is an ever-present demand for improved appearance, improved functionality, and improved aesthetics. Industrial design has become a highly skilled profession that focuses on fulfilling this need for enhanced consumer product appearance, functionality, and aesthetics.

One area that continually receives great attention for improvement is user displays. Providing crisp, attractive, unambiguous, and intuitively friendly displays and information for the user is very important in many consumer products. However, as consumer products constantly become smaller and smaller, and in some cases more and more complex, it becomes increasingly difficult to present and display user information in a manner that is easy for the user to grasp and understand, but is also in an uncluttered form and appearance that is aesthetically pleasing.

Much of the aesthetic appeal of a consumer product can quickly be compromised if there are too many display elements, or if too much display area is occupied by display elements that are not needed except at particular times. When not needed, these "passive" or unactivated display elements invariably remain visible to the user, even though in the "off" state. This is not only displeasing from an aesthetic standpoint, but it can be an annoying distraction that interferes with detection and understanding of other display elements that need to be observed at a given moment.

Many display elements are illuminated. Some display elements are illuminated continuously; others are illuminated only when appropriate to instruct and guide the user. Display elements that are not continuously illuminated can be distracting, or at least aesthetically objectionable, when not illuminated (when in the off state) because they still remain visible in the display area.

For example, one typical such display element is configured from transparent plastic inserts that penetrate through the metallic case of an electronic device, and are smoothly flush with the outer surface of the case. Oftentimes, a large number of such always-visible display elements leads to a cluttered, confusing, and unattractive appearance. In fact, even a single such element, when not illuminated (i.e., in an inactive state), can become an unattractive blotch on an otherwise smooth and attractive surface.

Less expensive device cases, for example, those made of opaque plastic rather than metal, are often similarly provided with transparent plastic inserts for illuminated display elements. These display elements also conflict with a good aesthetic appearance when they are not illuminated.

Also, prior displays using plastic or glass are less durable than metal and are more subject to breaking or cracking.

Additionally, the separate visible inserts utilized by prior techniques sometimes do not fit perfectly in the holes in which they are inserted or formed. Such imperfect fit can invite entry of liquids, dirt, and so forth, undesirably causing yet another disadvantage.

Thus, a need still remains for commercially feasible device display systems with improved aesthetics that unobtrusively furnish information as appropriate but otherwise do not distract or detract from the user's experience or the device's performance. Preferably, selected elements of such display systems would additionally become invisible in their off states.

In view of ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an invisible, light-transmissive display system with a light resistant material. Substantially invisible, tapered, light-transmissive holes are penetrated in a light-transmissive pattern through at least a portion of the light resistant material. The invisible holes are penetrated using a laser beam having a focal width less than the smallest diameter of the tapered holes.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 2A is an enlarged detail from FIG. 1 of status indicators shown in an illuminated state;

FIG. 2B is a view similar to FIG. 2A in which the status indicators are in an unilluminated state;

FIG. 3A is an enlarged detail from FIG. 1 of the caps lock indicator shown in an illuminated state;

FIG. 3B is a view similar to FIG. 3A in which the caps lock indicator is in an unilluminated state;

FIG. 4A is an enlarged detail from FIG. 1 of the sleep indicator shown in an illuminated state;

FIG. 4B is a view similar to FIG. 4A in which the sleep indicator is in an unilluminated state;

BEST MODE FOR CARRYING OUT THE INVENTION

Figure 1:
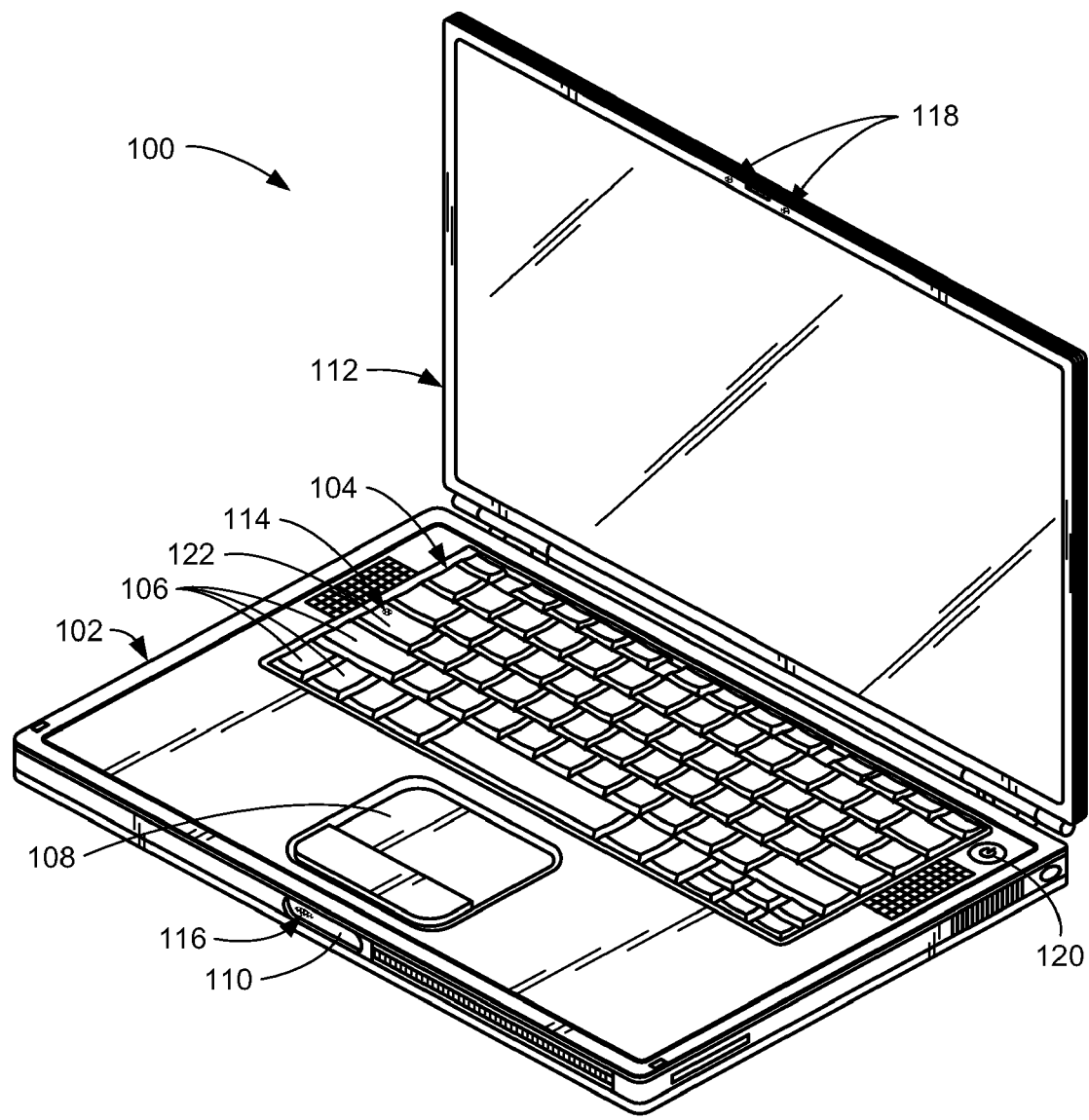
FIG. 1 is a view of a portable computer incorporating an invisible, light-transmissive display system according to the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs.

Similarly, although the views in the drawings for ease of description generally show similar orientations, this depiction in the FIGs. is arbitrary for the most part. Generally, the invention can be operated in any orientation. In addition, where multiple embodiments are disclosed and described having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the display, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane. The term "on" means that there is direct contact among elements.

The term "system" as used herein refers to and is defined as the method and as the apparatus of the present invention in accordance with the context in which the term is used.

Referring now to FIG. 1, therein is shown a portable computer 100 having a housing base 102 that supports a keyboard 104 having keys 106, a touchpad 108, a release latch 110, and so forth. The housing base 102 also supports conventional components (not shown) such as a power supply, a microprocessor ("CPU"), a computer memory, a hard drive ("HD"), an optical disk drive ("ODD"), and so forth. A display 112 is hingedly attached to the housing base 102, and when closed is retained in place by the release latch 110.

The portable computer 100 has several status indicators according to the present invention, as will be described in further detail below. These status indicators include, for example, a caps lock indicator 114, a sleep indicator 116, status indicators 118, a power button 120, and so forth. The caps lock indicator 114 is located in the caps lock key 122 of the keyboard 104 to indicate when the caps lock function of the keyboard 104 has been engaged. The sleep indicator 116 is located in the release latch 110 to indicate when the portable computer 100 has been engaged in a sleep mode. The status indicators 118 may be used to provide information concerning the status of any function or activity assigned thereto, for example, wireless link status, video camera status, low battery, battery charging, hard drive activity, and so forth. Similarly, the power button 120 can be illuminated to indicate that the computer is powered on, or may be illuminated upon opening the display 112 to assist in locating the power button 120, and so forth.

In prior computer configurations and designs, these various status indicators are ordinarily visible to the user in both the activated (or "on") and the inactivated (or "off") states. In the on state, an indicator will characteristically be illuminated continuously or periodically (e.g., cyclically), sometimes with a particular informational color according to the status that the indicator is reporting. In the off state, the indicator will typically be darkened (inactivated or unilluminated), but unfortunately (in many circumstances) can nonetheless still be seen. In the off state, therefore, the indicator often distracts and/or spoils the aesthetics of the portable computer 100.

In contrast, it is believed that a majority of consumers would find the portable computer 100 to be more attractive if status indicators of this sort became invisible in the off state. Of course, it will also be appreciated that there are other circumstances in which an indicator, such as a logo, would preferably remain visible even when in the off state, and circumstances of that sort are also addressed hereinbelow.

Concerning status indicators that would ideally not be visible (i.e., would disappear) in the off state, a principal difficulty faced by previous techniques is that such status indicators are ordinarily located in a partially or completely opaque display surface area. For the status indicator to function, therefore, the surface is interrupted at the status indicator location so that the light from the status indicator can be externally visible to the user. The consequent visible discontinuity in the appearance of the surface is therefore always visible to the user, whether the indicator is on or off.

There have been previous efforts to reduce or eliminate the visibility of such status indicators when in the off state. One such prior technique preserves the integrity of the display surface by reducing the thickness of a metallic display panel from the rear in the region or area of the status indictor. The thickness is reduced until the metallic display panel actually becomes light-transmissive. When light is then shined on the rear or back side of the metallic display panel, it passes through that region and becomes visible on the opposite (outer or front) side of the metallic display panel. Thus, by thinning the metal only from the back side, the opposite side of the metallic display panel remains smooth, untouched, and uninterrupted. As such, the status indicator region in the off or unilluminated state cannot be distinguished and is invisible from the unmodified outside surface of the metallic sheet.

In one implementation of this technique, a matrix of holes was formed from and into one side (e.g., the "back side") of a metal sheet nearly to the surface of the other side (e.g., the "front side"). For example, using laser ablation on an aluminum sheet, the holes were formed from the back side of the metallic aluminum sheet until there was a thickness of metal remaining at the front side on the order of only 12-20 nm. The matrix of holes was configured in the shape of a desired indicator, such as an arrow. The very small thickness of metal remaining at the end of each hole at the front surface of the metallic aluminum sheet allowed light to pass outwardly through the front surface of the sheet when the light was shined into the holes from the back surface thereof.

Unfortunately, such a reduced metallic thickness technique is very expensive due to the extreme precision required for the laser ablation (e.g., using a femtosecond laser) and the need for metallic sheets having a very even thickness and very even and flat surfaces. The need to have a perfectly flat metallic sheet can be somewhat mitigated by using a camera or other light-detecting device that is directed at the front surface of the metallic sheet in the vicinity where the holes are being laser-drilled from the back side of the sheet. The camera then detects light from the laser just as the remaining metal at the end of the hole becomes light transmissive. Upon detecting the desired intensity of light from the laser, the laser drilling process can then be terminated. However, this is a sensitive process and is very expensive.

Such reduced metallic thickness, light-through-metal status indicators are also fragile due to the very thin, easily damaged metallic membranes at the ends of the holes at the front surface of the metallic sheet.

Another disadvantage is that the amount of light transmitted is very small. For example, at 22 nm thickness of aluminum, only about one percent of the light is transmitted; at 12 nm approximately six percent is transmitted. Thus, intense illumination is needed on the back side of the metallic sheet to provide an acceptably visible status indication on the front surface.

The systems of the present invention overcome the numerous disadvantages of previous techniques. They also provide new versatility, options, and capabilities not achievable with previous techniques.

Referring now to FIG. 2A, therein is shown an enlarged detail from FIG. 1 of the status indicators 118 according to the present invention. The status indicators 118 are illustrated in the on or illuminated and visible state.

Referring now to FIG. 2B, therein is shown a view similar to FIG. 2A in which the status indicators 118 are in the off or unilluminated state. As can be seen, the status indicators 118 in the off state have become invisible. The surface of the display 112 in which the status indicators 118 are located is smooth, continuous, uncluttered, and uninterrupted.

Referring now to FIG. 3A, therein is shown an enlarged detail from FIG. 1 of the caps lock indicator 114 according to the present invention. The caps lock indicator 114 is illustrated in the on or illuminated and visible state.

Referring now to FIG. 3B, therein is shown a view similar to FIG. 3A in which the caps lock indicator 114 is in the off or unilluminated state. As can be seen, the caps lock indicator 114 in the off state has become invisible. The surface of the caps lock key 122 in which the caps lock indicator 114 is located is smooth, continuous, uncluttered, and uninterrupted.

Referring now to FIG. 4A, therein is shown an enlarged detail from FIG. 1 of the sleep indicator 116 according to the present invention. The sleep indicator 116 is illustrated in the on or illuminated and visible state.

Referring now to FIG. 4B, therein is shown a view similar to FIG. 4A in which the sleep indicator 116 is in the off or unilluminated state. As can be seen, the sleep indicator 116 in the off state has become invisible. The surface of the release latch 110 in which the sleep indicator 116 is located is smooth, continuous, uncluttered, and uninterrupted.

The status indicators 118, the caps lock indicator 114, the sleep indicator 116, and other desired display patterns that disappear in the off state, form "ghosted field" display patterns that appear and disappear (like ghosts) when turned on and off. As explained in greater detail hereinbelow, such invisible, light-transmissive display systems can be provided for viewing at an outer surface of a light resistant material. Such a light resistant material may be, for example, a substantially opaque material such as metal, or a light-absorbing but translucent material such as colored plastic, or a coated or painted material, or material of other appropriate composition and configuration. As used herein, therefore, "light resistant" refers to some degree of light attenuation, up to and including complete opacity.

Invisible holes are then penetrated in one or more desired light-transmissive display patterns through at least a portion of the light resistant material to provide the ghosted field display patterns.

Figure 5A:
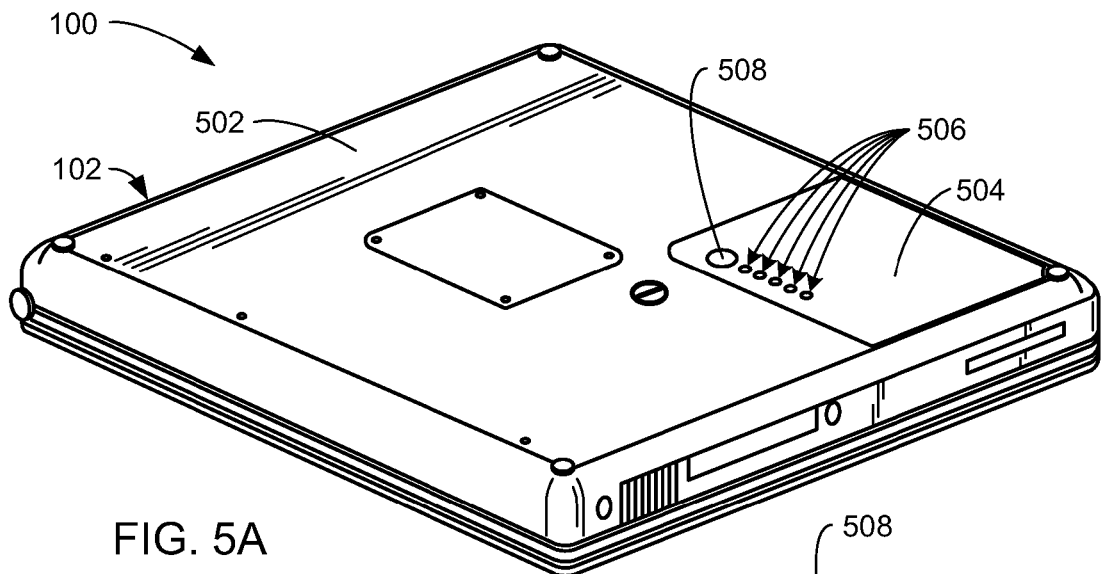
FIG. 5A is a bottom view of the portable computer of FIG. 1.

Referring now to FIG. 5A, therein is shown a bottom view of the portable computer 100 of FIG. 1. Accessible on the bottom 502 of the portable computer 100 is a battery pack 504 having battery status indicator lights 506. In one embodiment, for example, a test button 508 on the battery pack 504 can be actuated to cause the battery status indicator lights 506 to illuminate according to the charge state of the battery pack 504. The more battery status indicator lights 506 that illuminate, the higher the charge level of the battery pack 504. FIG. 5A illustrates the indicator state in which all five of the battery status indicator lights 506 are illuminated, showing a fully charged battery.

Figure 5B:
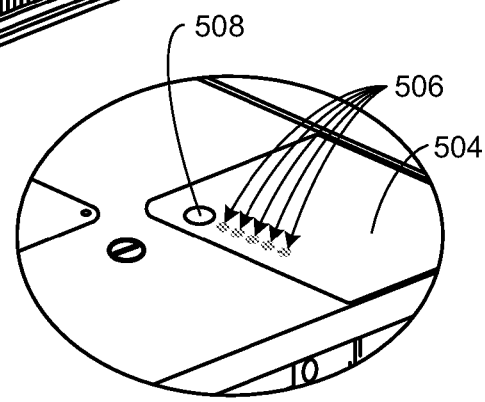
FIG. 5B is a view similar to FIG. 5A in which the battery status indicator lights are in an unilluminated state.

Referring now to FIG. 5B, therein is shown a detail from FIG. 5A in which the battery status indicator lights 506 are in the off or unilluminated state. However, although the battery status indicator lights 506 are off, they have not become invisible. Rather, in some situations, it may be desirable for a status indicator to remain at least partially visible when in the off state. For example, the battery status indicator lights 506 number five such indicators. Sometimes, actuation of the test button 508 will cause only some (or none) of the battery status indicator lights 506 to illuminate, thereby indicating a corresponding partially charged (or discharged) state for the battery pack 504. In such a case, it can be desirable for the remaining battery status indicator lights 506 that are in the off state to be visible so that the user can easily see what proportion is illuminated. Thus, as illustrated in FIG. 5B, the battery status indicator lights 506 are all in the off state but remain visible.

The persistent visibility for the battery status indicator lights 506 (or any other desired status indicators) when in the off state may be achieved, for example, by providing a different surface treatment on the surface where the status indicators are located, or, for example, heating the surface during formation of the status indicators sufficiently to discolor or even slightly burn the surface, to achieve the desired effect. Or, the surface may be colored such as by application of a paint, color, or dye in the desired pattern. Alternatively, or in addition, the status indicator through-the-surface light-conducting invisible holes (as explained below starting with the description of FIG. 7) may include additional holes of visible size and/or include clear coat formulations (as described further hereinbelow) that contrast with the surface where the status indicators are located. In this way, the locations and states of the indicators are always visible, even though the principle means by which the light is actually able to emanate from the display surface (i.e., the invisible holes) cannot be seen.

Figure 6A:
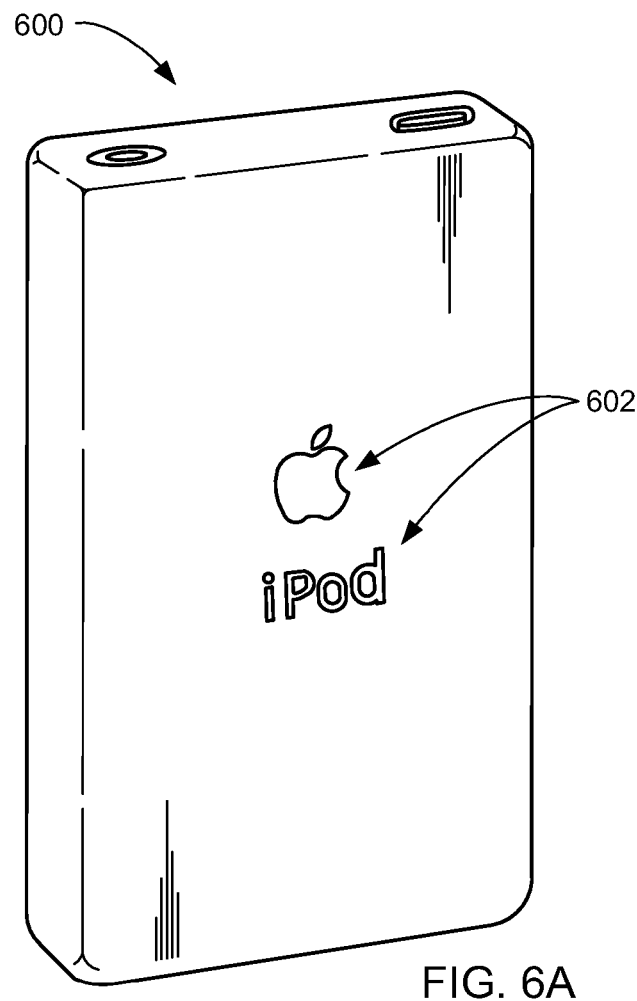
FIG. 6A is a view of a personal music player with a surface logo in an illuminated state.

Referring now to FIG. 6A, therein is shown a personal music player 600. A logo 602 is provided as an intrinsic, visible design on a surface of the personal music player 600, and is shown in the on (illuminated) state. Utilizing the invisible hole technology of the present invention (explained further hereinbelow), the light from the logo 602 emanates from the surface of the personal music player 600 with no visible source. To the unaided eye, the surface of the logo appears continuous, solid, metallic, and seemingly incapable of transmitting light. This continuous, uninterrupted and unblemished surface, which nevertheless emits light, is accordingly particularly aesthetically appealing.

Figure 6B:
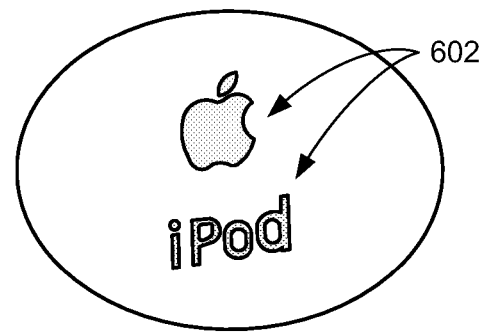
FIG. 6B is a detail from 6A showing the logo in an unilluminated state.

Referring now to FIG. 6B, therein is shown a detail from FIG. 6A showing the logo 602 in the off (unilluminated) state. Unlike the status indicators of the present invention that disappear in the off state (e.g., the status indicators 118 (FIG. 2B), the caps lock indicator 114 (FIG. 3B), and the sleep indicator 116 (FIG. 4B)), the logo 602, as depicted in FIG. 6B, remains visible in the off state (like the battery status indicator lights 506 (FIG. 5B)).

Accordingly, depending upon the implementation of the present invention (as detailed more particularly hereinbelow), a wide variety of effects and treatments can be provided as desired. Thus, as depicted in FIG. 6B, the unilluminated logo 602 may be configured to appear as a logo that is etched into a solid metallic surface. Then, upon illumination of the logo 602 from behind, light emanates from the seemingly solid metallic surface of the logo 602, as depicted in FIG. 6A, realizing a particularly attractive and dramatic effect.

Figure 7:
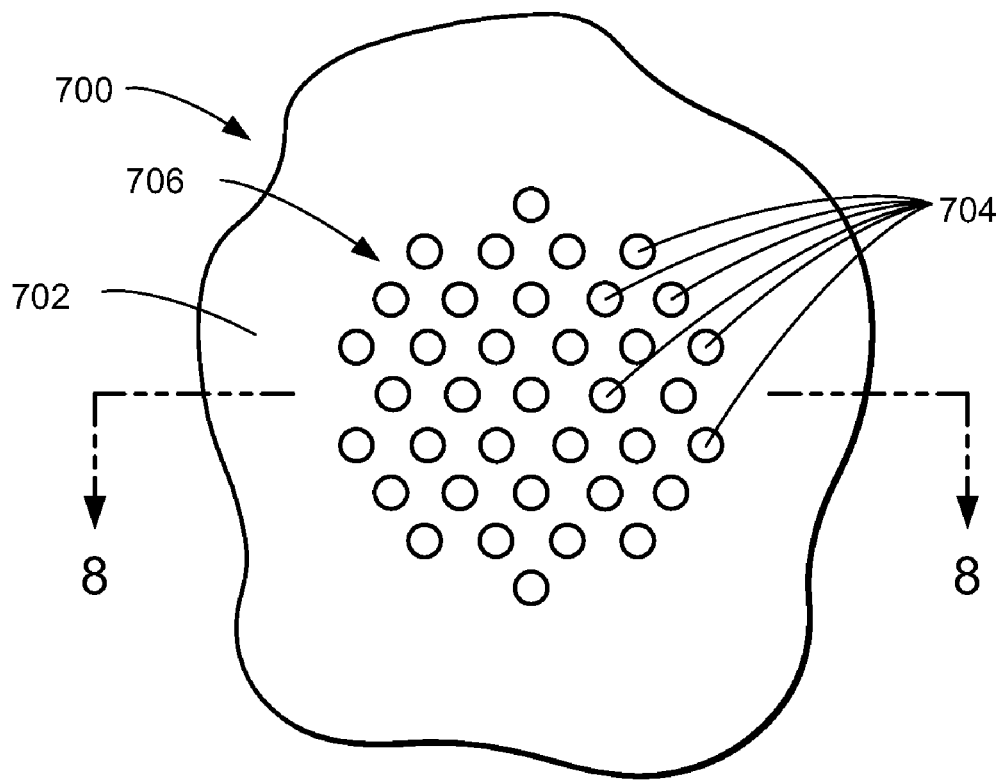
FIG. 7 is an enlarged view of a fragment of light resistant material having an opaque outer surface and incorporating an invisible, light-transmissive display system formed according to an embodiment of the present invention.

Referring now to FIG. 7, therein is shown an enlarged view of a fragment 700 of light resistant material having an opaque outer surface 702 according to an embodiment of the present invention. In one embodiment, the opaque outer surface 702 is the outer surface of a metallic sheet of aluminum. Holes 704 are formed in and penetrate through the opaque outer surface 702 to the opposite or inner side (i.e., the rear surface 804 shown in FIG. 8) of the fragment 700.

The holes 704, although shown greatly exaggerated in the drawing FIGs., are actually invisible. That is, each of the holes 704 is smaller than resolvable by an unaided human eye. For example, the limit of resolution for the human eye is about 0.1 mm at a distance from the eye of 1 meter. In children, the resolution might be somewhat finer, for example, 0.04 mm. Thus, depending upon the anticipated viewer and viewing distance, the holes 704 will be selected to be below the limit of resolution, and it will accordingly be understood that the term "invisible hole" refers to this upper limit. Thus, as defined herein, "invisible holes" refers to holes that are smaller than resolvable by an unaided human eye.

Conversely, it will be understood that the term "visible holes" refers to holes that are large enough to be resolvable by an unaided human eye.

As depicted in FIG. 7, the holes 704 are arranged in a pattern 706 of 37 holes that form a status indicator shaped in a generally circular pattern as a circle or dot. For expository reasons, just as the holes 704 are shown greatly exaggerated in size, so also is the size and arrangement of the pattern 706 greatly exaggerated. Typically, however, the pattern 706 will be large enough to be seen (when illuminated) by the unaided human eye—such as of the size of conventional status indicators.

In one embodiment in which the holes 704 are utilized to form status indicators for a portable computer such as the portable computer 100 (FIG. 1), the holes 704 have a diameter at the outer surface 702 of about 30 µm. Center-to-center spacings or pitch between the holes 704 is a nominal distance of about 200 µm. However, the size of the status indicator pattern itself (e.g., the pattern 706) can vary from a fraction of a mm to several mm across, depending upon the actual pattern that is depicted.

Figure 8:
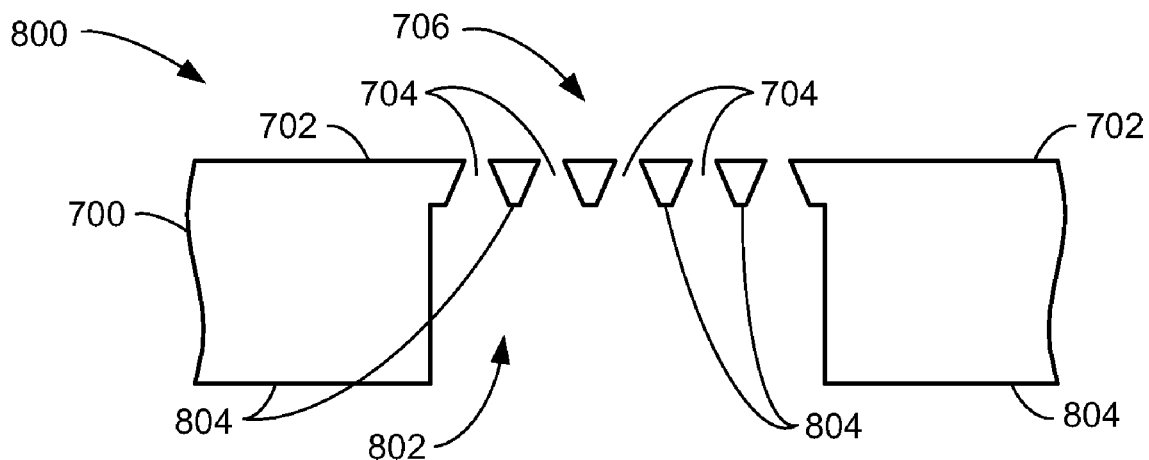
FIG. 8 is a cross-sectional view of the fragment shown in FIG. 7, taken on line 8-8 in FIG. 7.

Referring now to FIG. 8, therein is shown a cross-sectional view 800 of the fragment 700, taken on line 8-8 in FIG. 7, and showing further details of this embodiment of the present invention. In this embodiment, the fragment 700 is formed of an aluminum ("Al") sheet that is nominally about 0.5 mm thick. The fragment 700 has then been machined down in the vicinity of the pattern 706 to a thickness of about 400 µm-500 µm, forming a cavity 802 into the rear surface 804 of the fragment 700. The cavity 802, which is thus opposite the outer surface 702 in the vicinity of the pattern 706, facilitates formation of the holes 704 by thinning the thickness of the fragment 700 in the vicinity of the pattern 706. This reduces the amount of drilling needed to form the holes 704 through the fragment 700.

It will be appreciated, of course, that in certain situations the cavity 802 can be advantageous, while in others it may not appreciably improve overall manufacturing efficiency or speed. For example, when the fragment 700 is not particularly thick (e.g., on the order of up to 0.7 mm or so of Al), the additional time for laser drilling a pattern of holes such as the holes 704 may increase by only a few seconds to less than a minute. In such a case, it may be more efficient and economical to omit the cost and delay associated with first forming the cavity 802.

In this embodiment, the holes 704 are tapered, having about a 0.33 aspect ratio (i.e., the hole size at the outer surface 702 relative to the size at the rear surface 804). Thus, the hole 704 diameter at the rear surface 804 is about 90 µm.

Figure 9:
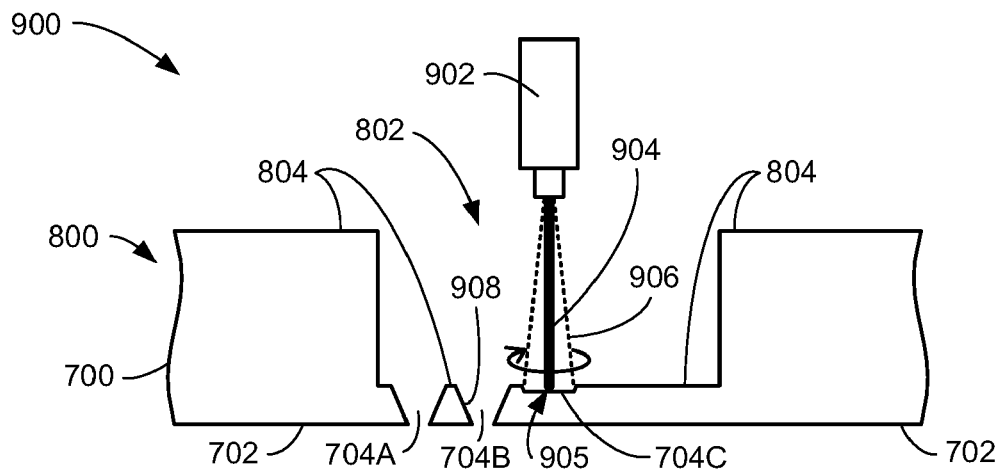
FIG. 9 is a view of a system for forming invisible holes according to the present invention.

Referring now to FIG. 9, therein is shown an embodiment of a hole-forming system 900 for forming the holes 704 according to the present invention. The formation of the holes 704 is shown in the early stages thereof, with two holes 704A and 704B formed, and laser drilling of a third hole 704C having just begun.

To form the holes 704, the fragment 700 is inverted, and formation of the holes is performed from the rear surface 804 using a laser 902, such as an ultra-violet ("UV") computer numerical controlled ("CNC") laser tool having, for example, a 1000 picometer wavelength laser beam 904 with a focal width 905 (spot size) of about 15 µm. In other embodiments, green lasers or YAG lasers can be used, in some cases more economically, such as when larger holes (e.g., greater than about 45 μm) are being formed through the fragment 700.

The term "tapered" is used and defined herein to mean a gradual narrowing toward one end. To achieve the tapered hole configuration, the laser beam 904 has been configured, as just described, with a focal width 905 no larger (and preferably less) than the smallest diameter of the tapered hole that is to be formed. In one embodiment, the focal width 905 is no larger than substantially half the smallest diameter of the tapered hole. The laser beam 904 is then initially orbited around the edges of the holes 704, as illustrated with respect to hole 704C, the dotted lines embraced within an arrow indicating the orbit 906 of the laser beam 904. The orbiting of the laser beam 904 is begun by describing the initial, largest hole diameter, which in this embodiment is about 90 μm at the rear surface 804. As the hole, such as hole 704C, then forms and deepens, the orbit 906 of the laser beam 904 is correspondingly tightened to progressively reduce the diameter of the obit 906, and thus reduce the diameter of the hole. At the conclusion of the hole formation at the outer surface 702, the orbit 906 has been progressively and continuously reduced until it is only, as in this embodiment, about 30 μm, which is still larger than the laser beam's focal width 905 of about 15 μm.

The formation of the holes 704 is thus a trepanning operation as the laser beam 904 "corkscrews" (cf. the arrow for the orbit 906) in a tightening spiral into and through the fragment 700. The laser 902 thus performs a tightening trepanation until the laser beam 904 exits at the outer surface 702 at the smallest diameter of the tapered hole 704. During this trepanning operation, as the laser beam 904 sweeps around the edge surface of the hole 704, the laser beam 904 melts the inner surface 908 of the hole 704, leaving the inner surface 908 with a clean, smooth, mirror finish formed thereon that aides in guiding and reflecting light therethrough.

It has been discovered that the controlled formation and shaping of the holes 704 with the laser beam 904 in this manner gives the holes the particular characteristics of having been formed using a laser beam having a focal width 905 less than the smallest diameter of the tapered holes. Other aspects of the holes and slots, as described further herein, have likewise been found to be characteristic of the manner in which they were formed by the laser beam.

Figure 10:
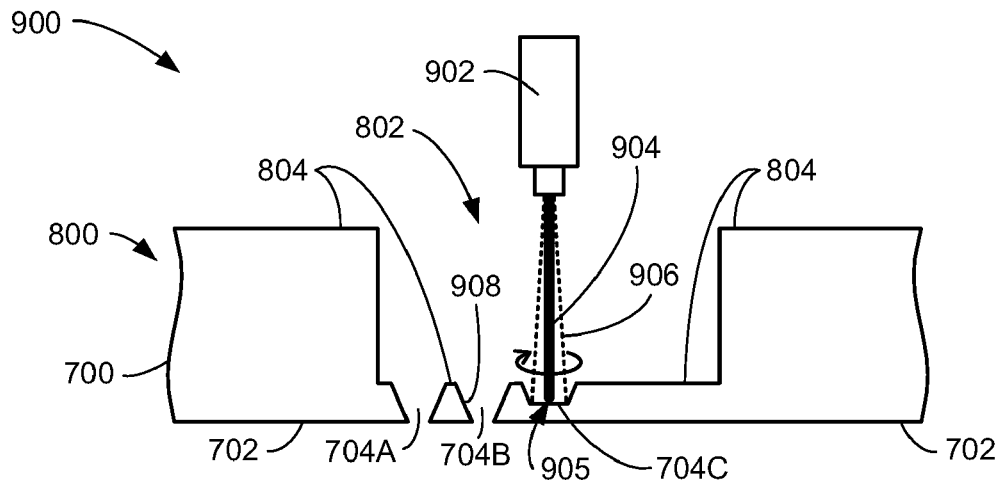
FIGS. 10 and 11 progressively depict the formation of the hole begun with the system shown in FIG. 9.
Figure 11:
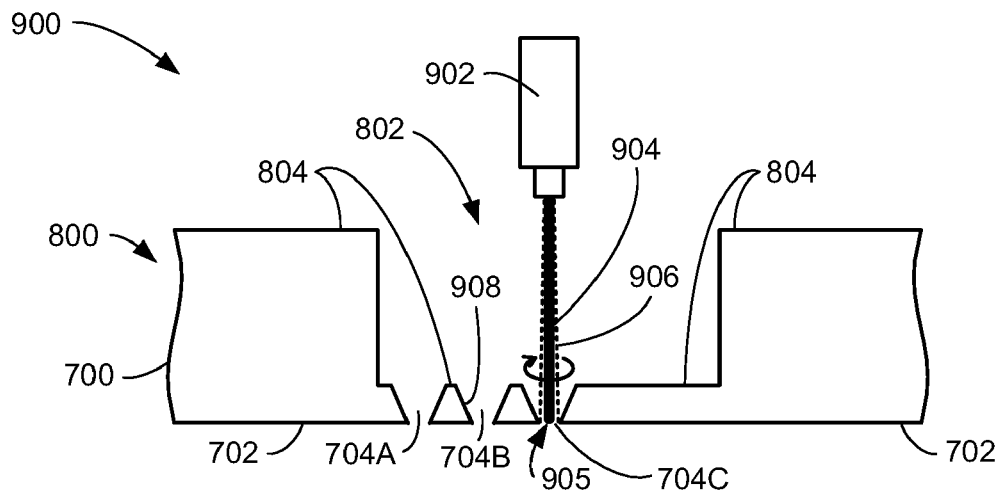

Referring now to FIGS. 10 and 11, therein is shown the structure of FIG. 9 progressively depicting the formation of the hole 704C, as just described. In FIG. 10, the hole 704C has been deepened from the earlier state shown in FIG. 9, and the orbit 906 has been reduced (tightened). In FIG. 11, the hole 704C has been completed, with the orbit 906 reduced to the diameter of the hole 704C at the outer surface 702.

Figure 12:
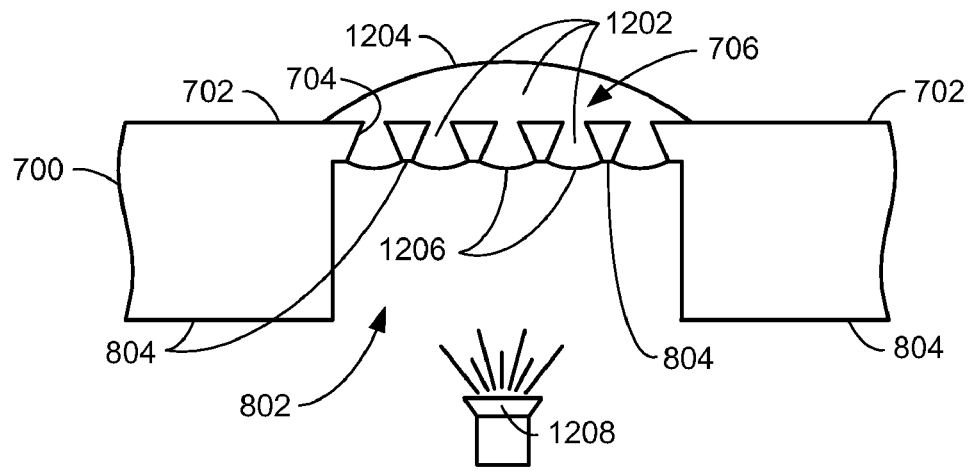
FIG. 12 is a view of the structure of FIG. 8 following application of a clear coat into the invisible holes.

Referring now to FIG. 12, therein is shown the structure of FIG. 8 following application of a light-conductive filler such as a clear coat 1202 into the holes 704. The clear coat 1202 may be any suitable clear or translucent coating or material, such as a clear paint or sealant, that functions as a light-conductive filler. Depending upon the particular use and configuration at hand, such a clear coat 1202 may be water based and cured by water evaporation, or polymer based (polymeric) and cured by ultraviolet ("UV") light, heat curable, and so forth, as is known in the liquid coating arts.

In one embodiment, the clear coat 1202 is a UV-curable polymeric liquid having a viscosity in the range of 25 centipoise. The clear coat 1202 is applied and filled into the holes 704 by orienting the outer surface 702 upwardly and placing a drop 1204 of the liquid clear coat 1202 on the outer surface 702, on top of the pattern 706, where the diameters of the holes 704 are the smallest. Gravity and capillary action, aided by the conical taper of the holes 704, then draw the clear coat 1202 into the holes 704, filling the holes from the smallest diameters thereof. After a time suitable for the liquid clear coat 1202 to be drawn thus into and through the holes 704, the clear coat 1202 is cured in the holes 704 by exposure to UV light 1208 from the rear surface 804.

In one embodiment, the application time for the clear coat 1202 can be extended, and/or the volume of the drop 1204 of the liquid clear coat 1202 increased, to allow the capillary action and gravity to slightly over-fill the holes 704 before curing, resulting in a dome 1206 of the clear coat 1202 on the inside end of each such filled hole 704. The domes 1206 extend convexly from the rear surface 804 and act somewhat like a prism to gather more light when illuminated from that side (i.e., illuminated from a light source at the rear surface 804).

After curing, the uncured remainder of the drop 1204 is removed (e.g., by wiping with a solvent) and the tops of the cured clear coat 1202 in the holes 704 are finished at the outer surface 702 as desired (for example, flush with the outer surface 702).

Figure 13:
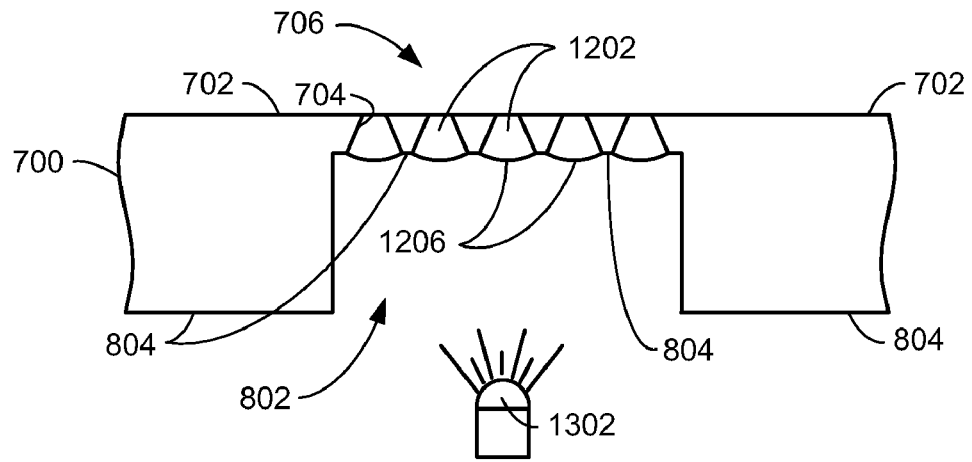
FIG. 13 is a view of the structure of FIG. 12 after finishing of the clear coat.

Referring now to FIG. 13, therein is shown the structure of FIG. 12 after application and finishing of the clear coat 1202 as just described. The pattern 706 is now ready to be illuminated, such as by a light 1302 located opposite or within the cavity 802 and configured for providing light to be transmitted through the holes 704 when the pattern 706 status indicator is actuated to the on state.

It has been discovered that the clear coat 1202 provides several aspects. For example, it closes and seals off the holes 704, protecting them from ingress of water, dirt, oil, and other contaminants that might degrade the light transmissivity thereof. The outer surface 702 is thus secured in case of exposure to contamination. It also provides for a smooth and continuous surface, free from visible breaks and break lines in the material.

Figure 14:
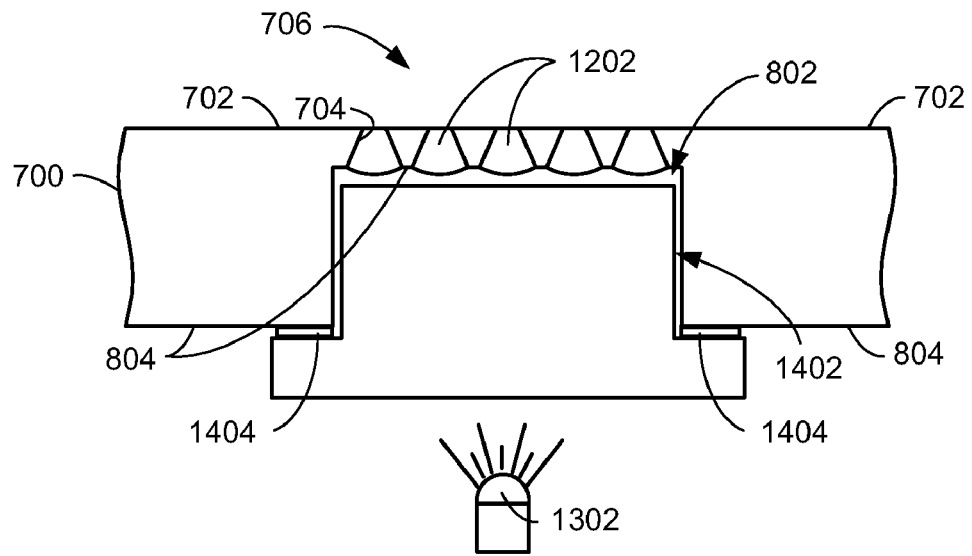
FIG. 14 is a view of the structure of FIG. 13 provided with a structural plug.

Referring now to FIG. 14, the fragment 700 has been optionally provided with a structural plug 1402 (for example of clear plastic) inserted into the cavity 802. A suitable adhesive, such as an adhesive tape 1404, may be used to secure the structural plug 1402 in the cavity 802. Alternatively, another suitable backfill material may be provided, such as a transparent liquid polymer that has been filled into the cavity 802 and then cured, to add structural support and return rigidity to the fragment 700 in the vicinity of the cavity 802. The additional structural reinforcement is advantageous because of the reduced thickness and reduced structural strength of the fragment 700 in the vicinity of the holes 704, and because of the further reduction in strength caused by the holes 704 themselves.

In view of the teachings herein, it will also be understood that a transparent or translucent structural reinforcing element, like the structural plug 1402, may be used to reinforce any portion of a light-transmissive display pattern, such as an indicator or logo area, of the present invention, whether or not a cavity such as the cavity 802 is present. This could be advantageous, for example, for a large logo wherein such a large number of the holes 704 would be formed that the structural integrity of the area would be reduced even in the absence of the cavity 802.

Figure 15:
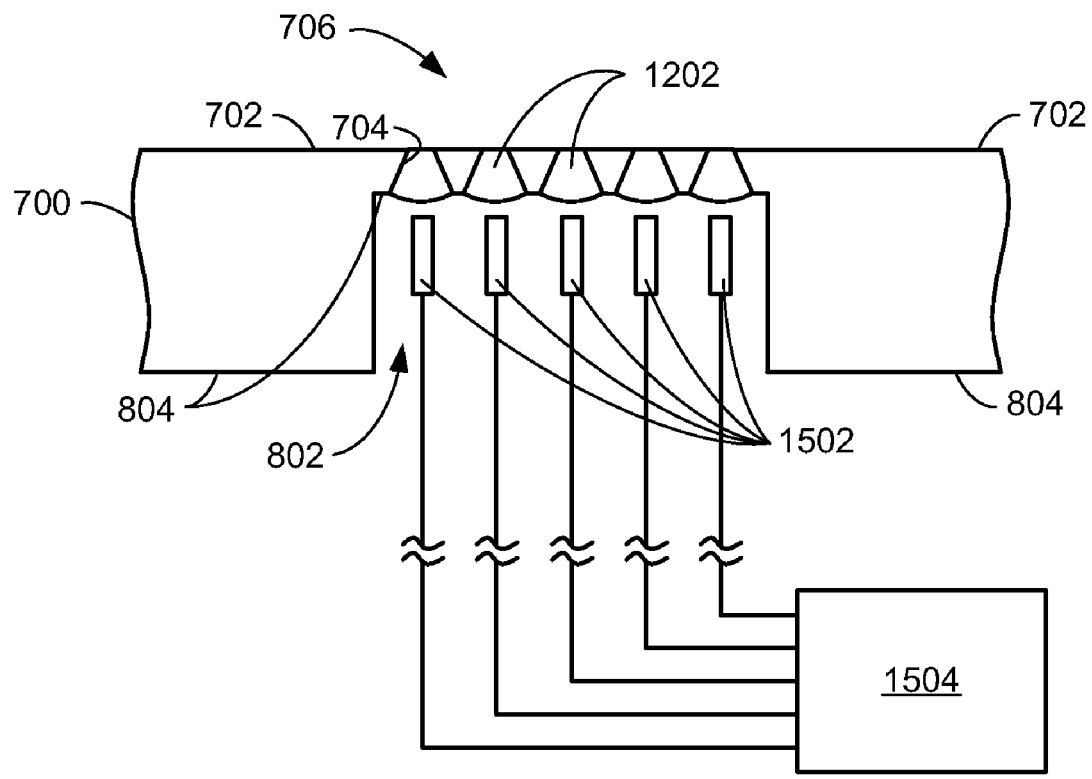
FIG. 15 is a view of a structure similar to that in FIG. 13 but having individual lights for each of the holes; for each of the holes.

Referring now to FIG. 15, therein is shown the structure of the fragment 700 in FIG. 13 provided with individual lights 1502, one for each of the holes 704, rather than the light 1302 (FIG. 13) that was common to all the holes 704. The individual lights 1502 are depicted representationally, it being intended and understood that the individual lights 1502 may be provided in a medium that is either discrete or continuous according to the particular application and needs at hand. Thus the individual lights 1502 may be, for example, individual light-emitting diodes ("LEDs"), light sources from a discrete or continuous organic light-emitting diode ("OLED") structure, or other individual light sources or emitters in discrete or continuous media as appropriate.

The individual lights 1502 can be individually controlled, for example by a CPU 1504 or other suitable controller responding in known fashion to appropriate programming or user input. Thus, it is possible to pair the holes 704 with corresponding individual lights 1502 to form individually controllable pixels. When aggregated together, these individual hole-light pixels form a controllable and changeable display. In this manner, by matching the pixel pitch (i.e., position and spacing) of the individual lights 1502 with the micro-perforated pattern of the holes 704, an invisible, programmable display can be made to appear through an apparently solid surface such as the opaque outer surface 702.

The individual lights 1502 are thus light sources that are configured and oriented behind the opaque outer surface 702 (metallic, plastic, coated, or otherwise) and are respectively aligned with the invisible holes 704. The holes 704 in this embodiment are invisible. The individual lights 1502 are then configured to controllably shine predetermined patterns of monochrome or multi-colored light through the invisible holes to cause the holes 704 to function as pixels to provide a controllable visual display through the seemingly solid surface. By virtue of the CPU 1504 (or other suitable mechanism) it is also possible to then choose and customize aesthetic and display motifs by selecting and controlling the light and light patterns that are displayed through the invisible holes 704.

It will now also be clear to one of ordinary skill in the art that these teachings may be combined as desired, such that, for example, a single or a number of monochrome or multi-colored light sources may be used to provide a visual display by shining the light through a selectively transmissive matrix. For example, the light may be shined through a liquid crystal display ("LCD") or a thin film transistor ("TFT") display having pixels aligned with respective individual invisible holes such as the holes 704.

Figure 16:
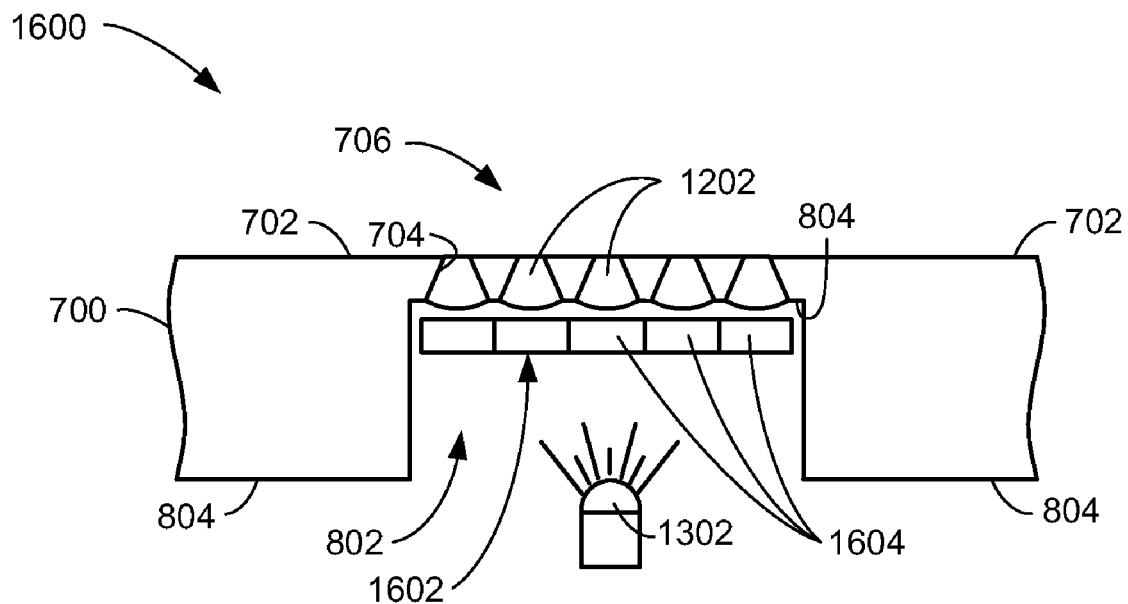
FIG. 16 is a view of a structure having a TFT layer aligned with the individual holes.

Referring now to FIG. 16, therein is shown such a combined configuration 1600. In this embodiment, a light source 1302 is positioned behind a TFT layer 1602. The individual pixels 1604 of the TFT layer 1602 are aligned with respective individual holes 704 to selectively and controllably shine predetermined patterns of monochrome or multi-colored light through the holes 704, as desired. From the perspective of the holes 704, each of the individual pixels 1604 is configured as a light source aligned with its respective corresponding hole 704. In the aggregate, therefore, patterns of monochrome or multi-colored light can be controllably shined through the holes 704 to cause the holes 704 to function as pixels to provide a controllable visual display.

It will also now be clear that the holes 704 can be utilized bi-directionally for receiving light as well as transmitting it. Thus, for example, the individual lights 1502 (FIG. 15) or the TFT layer 1602, for example, may also be configured to detect as well as transmit light, or even just to detect light. Such light detectors may serve, for example, for receiving external control inputs for a processor, controller, or other device, such as the CPU 1504 (FIG. 15).

It has been unexpectedly discovered that the invisible, light-transmissive display system of the present invention provides exceptional versatility and choice in the presentation of displays. For example, in order to make the displays virtually invisible when the status indicators are in the off status, as illustrated for example in FIGS. 2B, 3B, and 4B, various surface effects and/or filler effects can be employed. That is, for example, with a smoothly polished (e.g., mirror finished) opaque outer surface 702 (such as illustrated in FIG. 7), the presence of the invisible holes 704 (but not the holes themselves) can sometimes be noticed because the holes will be slightly less reflective. The holes 704 will therefore cause such a polished surface to appear slightly duller where the holes are located even though the holes themselves are not visible.

One way to compensate for the slightly less reflective properties of the holes, according to the present invention, is to provide a textured surface rather than smoothly polished surface (as also illustrated in FIG. 7). The surface may be textured such as by burnishing, etching, sandblasting, anodizing, engraving, and so forth. When the micro-texture of the surface is made irregular in this manner, the invisible holes 704 tend to blend in—that is, they get "lost" in the visual noise of the surface texture. The rougher the texture depth, the more likely the pattern 706 of the invisible holes 704 will get lost within that texture when unilluminated.

In one embodiment, for example, having a surface roughness of 1.8 RA, the surface texture has peaks and valleys that have 30-40 μm ranges in them. So a 30 μm hole, such as the invisible hole 704 at the outer surface 702, blends in nicely within a peak and a valley of 30 μm. Thus there is no "surface blemish" that might otherwise be seen from the aggregation of the holes 704 that form the pattern 706, inasmuch as the surface texture is substantially as large as the hole sizes at that textured surface. In another embodiment, the aggregate presence of the invisible holes 704 can be further disguised by darkening the surface finish slightly, such as by anodization, to provide, for example, a bluish or grayish cast.

It will also be understood and appreciated by those of ordinary skill in the art, based on this disclosure, that the hole spacings and sizes need not be as uniform as they are illustrated in the above drawing FIGs. Variable spacings, sizes, and shapes may be used to achieve effects, such as differences in texture, gradations in brightness, and so forth. Hole patterns, angles, and pitch (spacings) can be varied and adjusted to avoid pointilization (i.e., pixilation), hot spots, and so forth, and/or to achieve desired effects, such as pointilization, hot spots, and so forth. Light distribution aides, such as light diffusers, can also be used behind the invisible holes 704, as may be beneficial in certain circumstances.

Figure 17:
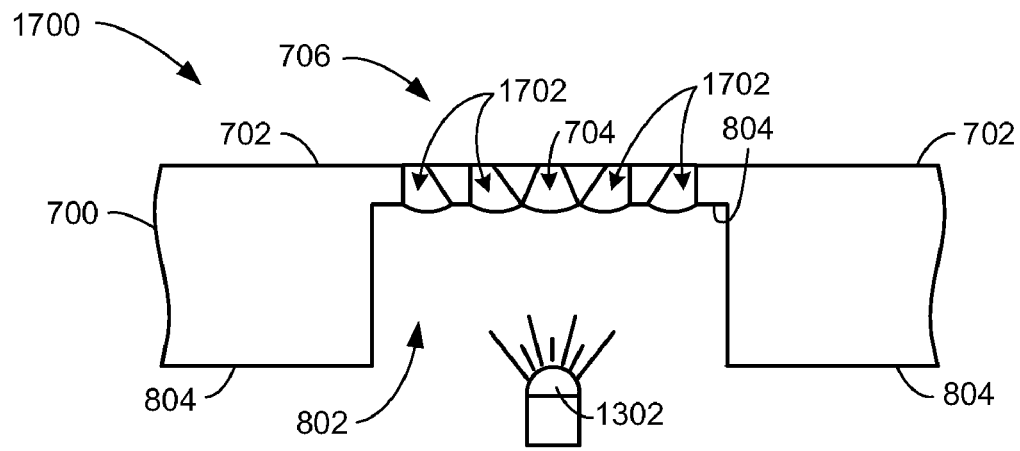
FIG. 17 is a view of an embodiment of the present invention incorporating invisible holes that are outwardly directed.

Referring now to FIG. 17, therein is shown an embodiment 1700 of the present invention incorporating invisible holes 1702 that are outwardly directed or tilted away from the central axis of the pattern 706. This provides a wider viewing angle above the outer surface 702 by dispersing the light from light 1302 over a wider angle.

Embodiment 1700 also illustrates another aspect of the present invention. The holes 1702 are not formed as symmetrical cones about an axis normal to the outer surface 702 and to the rear surface 804. Instead, the shape of the cones has been offset at an outward angle, thus providing an angled hole shape having a principle axis that directs the light outwardly.

The shape of the holes 1702 is readily formed by the laser 902 (FIG. 9) by controlling the laser 902 to trepan the holes 1702 asymmetrically, as shown. Similarly, other invisible hole shapes can be formed, such as oval holes, oval and/or flattened cones, and so forth, by correspondingly controlling the trepanning orbits of the laser beam 904 to achieve the desired hole shapes and profiles. It has been unexpectedly discovered, in fact, that trepanning in this manner can be particularly advantageous because angled holes can be thus achieved without having to change the angle of the laser 902 itself. The patterns 706 can thus be customized with individual invisible holes each tailored as desired without having to alter the angular setting of the laser 902 for each such hole.

Figure 18:
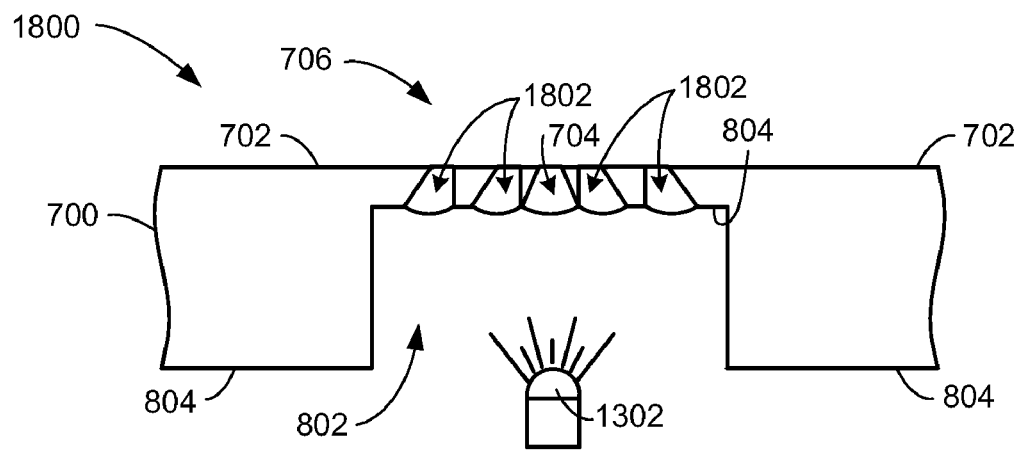
FIG. 18 is a view of an embodiment of the present invention incorporating invisible holes that are inwardly directed.

Referring now to FIG. 18, therein is shown an embodiment 1800 having invisible holes 1802 that are inwardly directed or tilted toward the central axis of the pattern 706. The embodiment 1800 thus illustrates another configuration for customizing the invisible holes according to the desired uses and applications. In this case, the invisible holes 1802 can be angled to narrow the viewing angle, thereby providing a more private viewing experience, for example. The invisible holes 1802 could also, for example, be aimed at a common point or region above the outer surface 702 to provide a visual "hot spot" at which the pattern 706 is particularly brilliant to the viewer. This could be used advantageously, for example, to guide a viewer to a preferred viewing position and/or distance.

Figure 19:
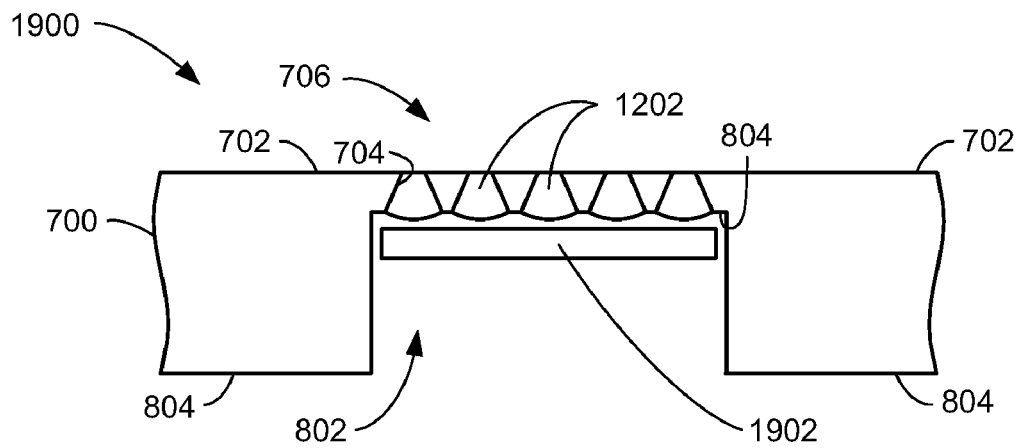
FIG. 19 is a view of an embodiment having a light sensitive receptor behind the invisible holes.

Referring now to FIG. 19, therein is shown an embodiment 1900 having a light sensitive receptor 1902 behind the invisible holes 704, beneath the rear surface 804 of the fragment 700, and configured for sensing light through the invisible light-transmissive holes 704. The light sensitive receptor 1902 may be sensitive to visible light to provide ambient light sensing ("ALS"), for example, and/or sensitive to infra-red ("IR") light to receive IR control signals from a remote control transmitter, for example. It will also be understood and appreciated now by those of ordinary skill in the art, based on the present disclosure, that in fact any appropriate light-sensitive function can be supported by a corresponding and appropriate light sensitive receptor 1902, all without a visible blemish or "window" on the outer surface 702.

Figure 20:
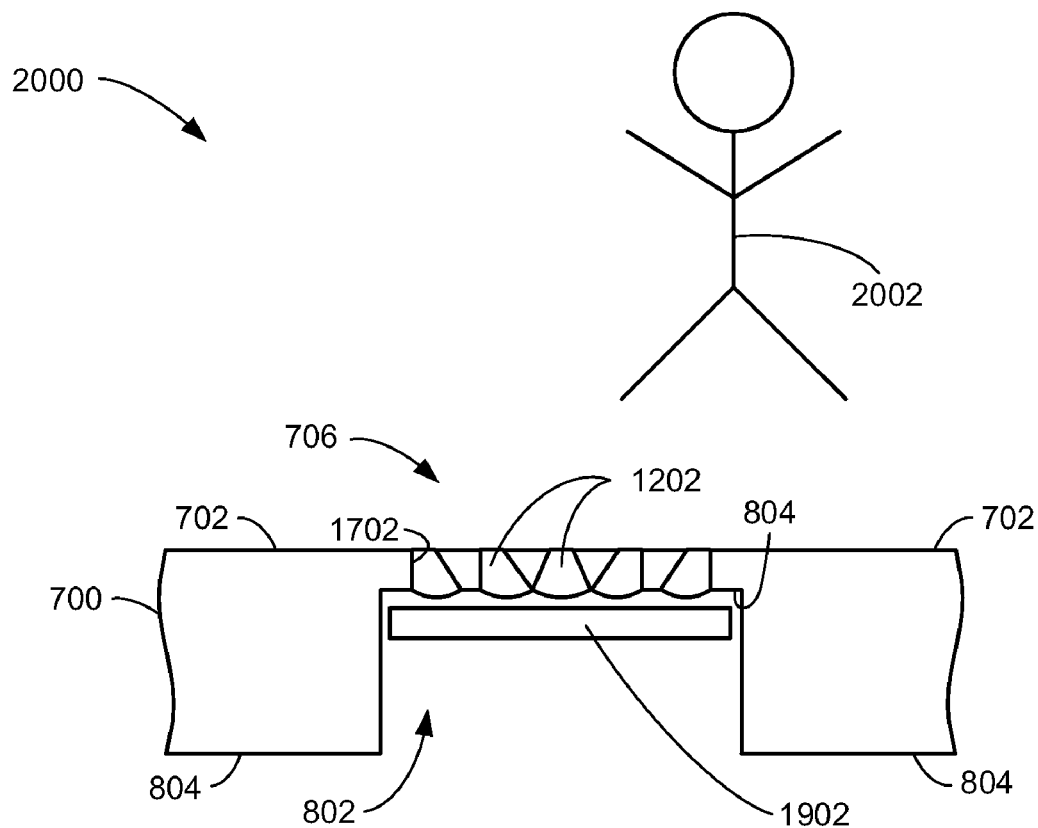
FIG. 20 is a view of an embodiment of the present invention configured as an invisible proximity detector.

Referring now to FIG. 20, therein is shown an embodiment 2000 configured as an invisible proximity detector. For example, the light sensitive receptor 1902 may be sensitive to IR in a manner similar to conventional motion detectors. Motion, such as motion of a person 2002, in the vicinity of the pattern 706 will then be detected and may be utilized as desired, such as, for example to turn a device on, to play a greeting, to turn the device off or put it to sleep (e.g., when no one is detected), and so forth. To improve the range of sensitivity, an outwardly angled hole pattern is used such as illustrated in FIG. 17.

Figure 21:
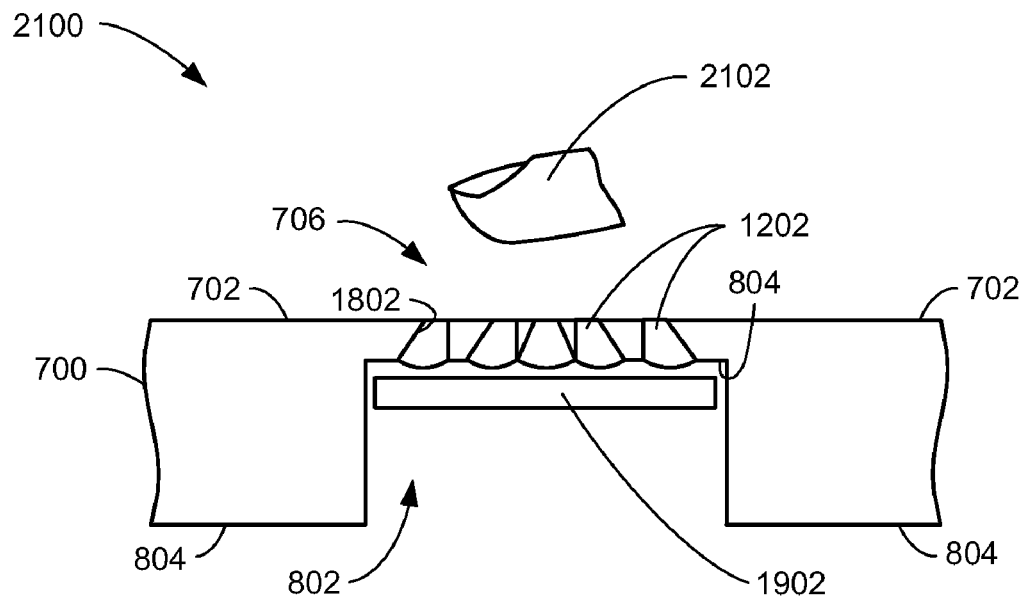
FIG. 21 is a view of an embodiment of the present invention configured as an invisible button.

Referring now to FIG. 21, therein is shown an embodiment 2100 configured as an invisible button. To focus the sensitivity to a small region immediately above the pattern 706, an inwardly angled hole pattern is used such as illustrated in FIG. 18. Then, whenever a finger 2102 is positioned immediately thereabove, the light sensitive receptor 1902, which may be similarly selected to be sensitive to IR, detects the presence of the finger 2102 for generating a suitable signal the same as if a conventional button had been pressed. However in this case, the button is not visible, according to the present invention, but instead the embodiment 2100 provides button emulation.

Figure 22:
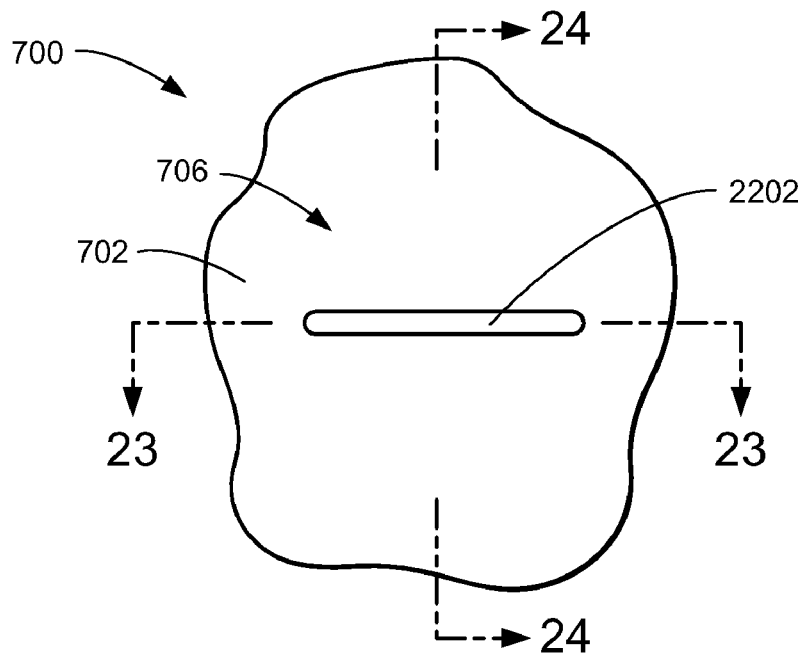
FIG. 22 is a view of an embodiment of the present invention configured as an invisible slot.

Referring now to FIG. 22, therein is shown a view similar to FIG. 7 of a pattern 706 that is a variation upon the previously described shapes of invisible holes. In this embodiment, the hole has been elongated transversely into an invisible slot 2202, it being understood that the term "slot" is thus used and defined in its usual sense to mean an opening that is longer in one dimension than in the transverse dimension. It will be understood that the invisible slot 2202 may then be filled, if desired, for example with the clear coat 1202 (not shown) similarly as the invisible holes 704. The invisible slot 2202 may also be combined with other invisible slots and/or invisible holes of various shapes, patterns, and dimensions, according to the present invention, as may be desired or advantageous.

Figure 23:
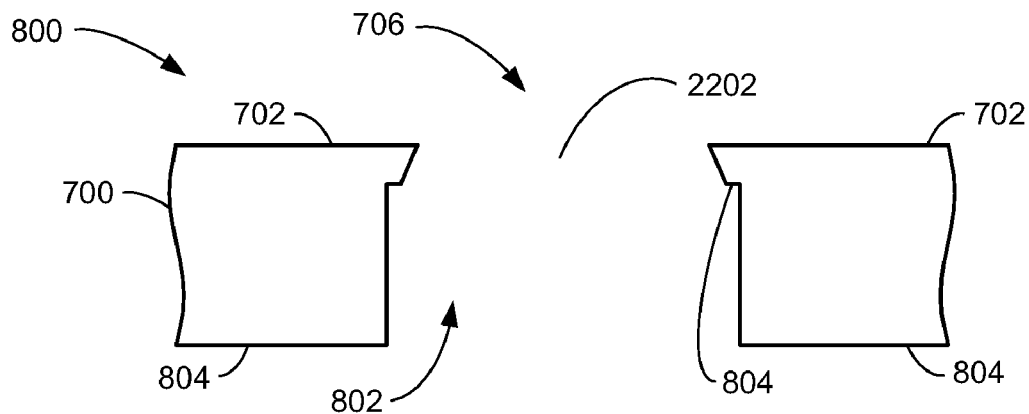
FIG. 23 is a cross-sectional view of the invisible slot shown in FIG. 22 taken on line 23-23 in FIG. 22.

Referring now to FIG. 23, therein is shown a cross-sectional view of the invisible slot 2202 taken on line 23-23 in FIG. 22.

Figure 24:
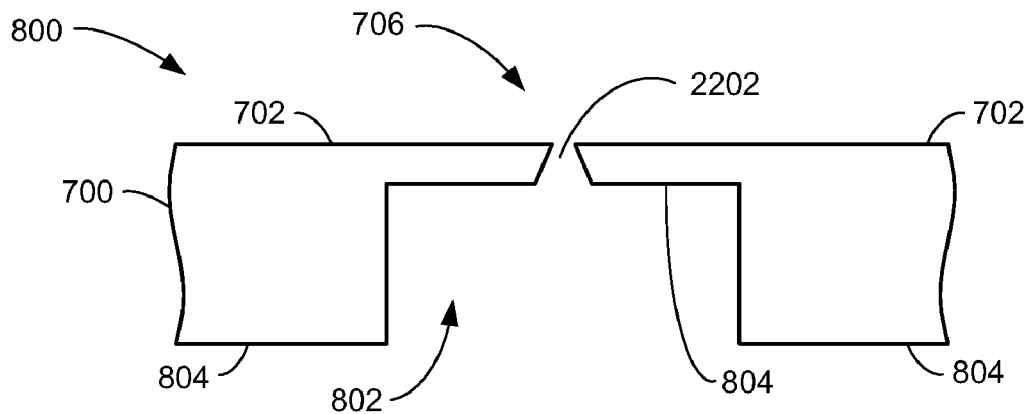
FIG. 24 is a cross-sectional view of the invisible slot shown in FIG. 22 taken on line 24-24 in FIG. 22.

Referring now to FIG. 24, therein is shown a cross-sectional view of the invisible slot 2202 taken on line 24-24 in FIG. 22, and showing the tapered cross-sectional profile of the invisible slot 2202, similar to the taper of the invisible holes 704 (FIG. 8), the slot taper being formable in like manner to that of the holes.

Figure 25:
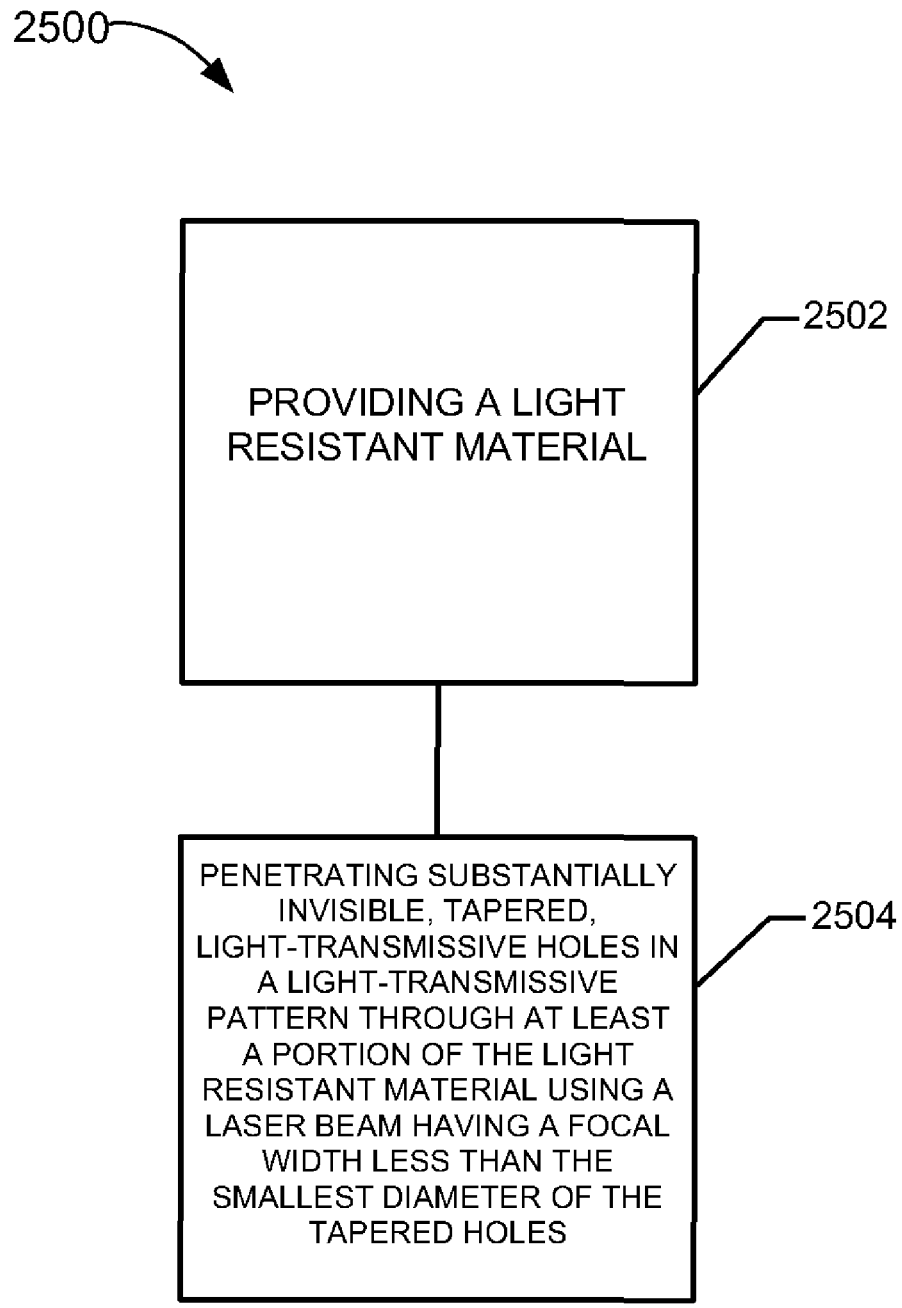
FIG. 25 is a flow chart of a process for manufacturing an invisible, light-transmissive display system in accordance with an embodiment of the present invention.

Referring now to FIG. 25, therein is shown a flow chart of a process 2500 for manufacturing an invisible, light-transmissive display system in accordance with an embodiment of the present invention. The process 2500 includes providing a light resistant material in a block 2502; and penetrating substantially invisible, tapered, light-transmissive holes in a light-transmissive pattern through at least a portion of the light resistant material using a laser beam having a focal width less than the smallest diameter of the tapered holes in a block 2504.

It has been discovered that the present invention thus has numerous aspects.

A principle aspect that has been unexpectedly discovered is that the system of the present invention can economically and unobtrusively provide highly effective, aesthetically pleasing, and highly desirable surface displays that can be made invisible when not activated.

Another aspect is that the system of the present invention can provide for light emanation from an apparently solid surface, with or without an intrinsic, visible design in that surface area.

Another aspect is that the system of the present invention closes and seals off the invisible holes, protecting and securing them and the outer surface from ingress of contaminants.

Another aspect is that the system of the present invention provides for a smooth and continuous surface, free from visible breaks and break lines in the material.

Another aspect is that the system of the present invention provides for IR remote control through a light resistant surface, such as metal, without requiring a traditional window.

Another aspect is that the system of the present invention can be used with many types of light resistant materials, such as steel, plastic, ceramics, and so forth, in addition to aluminum.

Another aspect is that the system of the present invention makes the elements of the display (the micro-perforations that form the invisible holes) small enough that they are not readily perceivable.

Another important aspect is that the system of the present invention enables hardly perceivable and unperceivable windows (e.g., arrays of the invisible holes) to be put into materials, such as metal, that ordinarily require separate and readily visible breaches in the surfaces thereof.

Another aspect is that the system of the present invention successfully provides and enables an invisible light pipe through otherwise solid materials such as metal.

Another important aspect is that the system of the present invention can be utilized with great success and effect with materials as described above that are not entirely opaque. Thus, invisible, light-transmissive display systems can be provided for viewing at an outer surface, not only of substantially opaque materials, but also of materials that are not opaque. A light resistant material that nevertheless allows some light to pass through, such as a translucent colored plastic, can furnish the basis for very dramatic display systems according to the present invention. Thus, in view of the teachings herein, it will now be clear to one of ordinary skill in the art that the invisible holes and systems according to the present invention, penetrated in a desired light-transmissive display pattern through at least a portion of light resistant material, will cause much brighter (and pleasingly unexpected) display patterns than if shined through materials that lack the present invention.

Another aspect is that the system of the present invention can be used for an extensive variety of desired displays, such as informational patterns, logos, control indication patterns, status indication patterns, directive patterns, artistic patterns, and so forth.

Yet another aspect is that the system of the present invention makes it possible to provide for and to enable the user to choose and thus customize aesthetic and display motifs according to individual preferences, by selecting and controlling the light and light patterns that are displayed through the invisible holes.

Another aspect is that the system of the present invention can provide selectable illumination through visible and otherwise apparently solid displays, designs, patterns, indicators, logos, and so forth.

Another aspect is that the system of the present invention can be used with virtually any kind of device needing or benefiting from an illuminated display configuration, such as computers, display panels, personal data assistants, personal music players, appliance instrumentation, vehicle instrumentation, a vehicle display, electronics instrumentation or display, jewelry, interactive kiosks, automated tellers, communication devices (such as cell phones, wired and wireless telephones, walkie-talkies, etc.), remote control devices, medical instruments or devices, training simulators, and so forth.

Another aspect is that the present invention allows displays to be provided in a fully metallic surface, thereby reducing vulnerability and improving the durability and robustness thereof.

Yet another important aspect of the system of the present invention is that it valuably supports and services the historical trend of reducing costs, simplifying systems, and increasing performance.

These and other valuable aspects of the present invention consequently further the state of the technology to at least the next level.

Thus, it has been discovered that the invisible, light-transmissive display system of the present invention furnishes important and heretofore unknown and unavailable solutions, capabilities, and functional aspects for display systems for electronic and other devices. The resulting configurations are straightforward, cost-effective, uncomplicated, aesthetically pleasing and attractive, highly versatile and effective, can be surprisingly and unobviously implemented by adapting known technologies, and are thus readily suited for efficiently and economically manufacturing highly desirable and appealing invisible display systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

The invention claimed is:

1. A method of manufacturing an invisible, light-transmissive system, comprising:
    providing a light resistant material; and
    penetrating substantially invisible, tapered, light-transmissive holes in a light-transmissive pattern through the light resistant material using a laser beam having a focal width less than the smallest diameter of the tapered holes.

2. The method as claimed in claim 1 wherein penetrating substantially invisible, tapered, light-transmissive holes in a light-transmissive pattern further comprises trepanning the tapered holes with the laser beam.

3. The method as claimed in claim 1 wherein penetrating substantially invisible, tapered, light-transmissive holes in a light-transmissive pattern further comprises trepanning the tapered holes by orbiting the laser beam around the edges of the holes.

4. The method as claimed in claim 1 wherein penetrating substantially invisible, tapered, light-transmissive holes in a light-transmissive pattern further comprises trepanning the tapered holes with the laser beam by:
    beginning penetrating the holes by orbiting the laser beam around the edges of the holes to describe the initial, largest hole diameter; and
    as each hole forms and deepens, tightening the orbit to progressively reduce the diameter of the orbit and of the hole.

5. The method as claimed in claim 1 wherein penetrating substantially invisible, tapered, light-transmissive holes in a light-transmissive pattern further comprises penetrating substantially conical holes with the laser beam.

6. The method as claimed in claim 1 wherein penetrating substantially invisible, tapered, light-transmissive holes in a light-transmissive pattern further comprises penetrating substantially symmetrical conical holes having an aspect ratio of about 0.33.

7. The method as claimed in claim 1 wherein penetrating substantially invisible, tapered, light-transmissive holes in a light-transmissive pattern further comprises penetrating substantially conical holes at least some of which are outwardly tilted with respect to the pattern.

8. The method as claimed in claim 1 wherein penetrating substantially invisible, tapered, light-transmissive holes in a light-transmissive pattern further comprises trepanning substantially conical holes at least some of which are outwardly tilted with respect to the pattern.

9. The method as claimed in claim 1 wherein penetrating substantially invisible, tapered, light-transmissive holes in a light-transmissive pattern further comprises penetrating substantially conical holes at least some of which are inwardly tilted with respect to the pattern.

10. The method as claimed in claim 1 wherein penetrating substantially invisible, tapered, light-transmissive holes in a light-transmissive pattern further comprises trepanning substantially conical holes at least some of which are inwardly tilted with respect to the pattern.

11. The method as claimed in claim 1 wherein penetrating substantially invisible, tapered, light-transmissive holes in a light-transmissive pattern further comprises penetrating at least one invisible slot with the laser beam.

12. The method as claimed in claim 1 wherein penetrating substantially invisible, tapered, light-transmissive holes in a light-transmissive pattern further comprises melting the inner surfaces of the holes with the laser beam to form a smooth mirror finish thereon.

13. The method as claimed in claim 1 wherein penetrating substantially invisible, tapered, light-transmissive holes further comprises penetrating using a laser beam having a focal width no larger than substantially half the smallest diameter of the tapered holes.

14. The method as claimed in claim 1 wherein providing a light resistant material further comprises providing a light resistant material having a textured surface.

15. The method as claimed in claim 1 wherein providing a light resistant material further comprises providing a light resistant material having a textured surface in which the surface texture is substantially at least as large as the hole sizes at the textured surface.

16. The method as claimed in claim 1 further comprising filling the invisible tapered holes with a light-conductive filler.

17. The method as claimed in claim 1 further comprising filling the invisible tapered holes, from the smallest diameter thereof, with a light-conductive filler.

18. The method as claimed in claim 1 further comprising over-filling the invisible tapered holes with a light-conductive filler to form a dome of filler on at least one end of each hole.

19. The method as claimed in claim 1 further comprising:
filling the invisible tapered holes with a light-conductive, curable filler;
curing the filler;
removing the uncured remainder of the filler; and
finishing the cured filler at least one outer surface of the light resistant material.

20. The method as claimed in claim 1 further comprising:
filling the invisible tapered holes with a light-conductive, UV-curable polymeric filler; and
curing the filler.

21. The method as claimed in claim 1 further comprising:
filling the invisible tapered holes, from the smallest diameter thereof, with a light-conductive, UV-curable polymeric filler; and
curing the filler.

22. The method as claimed in claim 1 further comprising:
over-filling the invisible tapered holes with a light-conductive, UV-curable polymeric filler to form a dome of filler on at least one end of each hole; and
curing the filler.

23. The method as claimed in claim 1 further comprising:
filling the invisible tapered holes, from the smallest diameter thereof, with a light-conductive, UV-curable polymeric filler;
curing the filler;
removing the uncured remainder of the filler; and
finishing the cured filler at least one outer surface of the light resistant material.

24. A method of manufacturing an invisible, light-transmissive system, comprising:
providing a light resistant material; and
penetrating at least one substantially invisible light-transmissive slot in a light-transmissive pattern through the light resistant material.

25. The method as claimed in claim 24 wherein penetrating at least one substantially invisible light-transmissive slot in a light-transmissive pattern further comprises trepanning the slot with a laser beam.

26. The method as claimed in claim 24 wherein providing a light resistant material further comprises providing a light resistant material having a textured surface.

27. The method as claimed in claim 24 further comprising filling the invisible light-transmissive slot with a light-conductive filler.

28. The method as claimed in claim 24 further comprising:
filling the invisible light-transmissive slot with a light-conductive, UV-curable polymeric filler; and
curing the filler.

29. A method of manufacturing an invisible, light-transmissive system, comprising:
providing a light resistant material;
penetrating substantially invisible light-transmissive holes in a light-transmissive pattern through the light resistant material; and
sensing light through the invisible light-transmissive holes.

30. The method as claimed in claim 29 wherein penetrating substantially invisible light-transmissive holes in a light-transmissive pattern further comprises penetrating substantially tapered holes at least some of which are outwardly tilted with respect to the pattern.

31. The method as claimed in claim 29 wherein penetrating substantially invisible light-transmissive holes in a light-transmissive pattern further comprises laser beam trepanning substantially tapered holes at least some of which are outwardly tilted with respect to the pattern.

32. The method as claimed in claim 29 wherein penetrating substantially invisible light-transmissive holes in a light-transmissive pattern further comprises penetrating substantially tapered holes at least some of which are inwardly tilted with respect to the pattern.

33. The method as claimed in claim 29 wherein penetrating substantially invisible light-transmissive holes in a light-transmissive pattern further comprises laser beam trepanning substantially tapered holes at least some of which are inwardly tilted with respect to the pattern.

34. The method as claimed in claim 29 wherein sensing light through the invisible light-transmissive holes further comprises sensing ambient light through the invisible light-transmissive holes.

35. The method as claimed in claim 29 wherein sensing light through the invisible light-transmissive holes further comprises receiving IR control signals through the invisible light-transmissive holes.

36. The method as claimed in claim 29 wherein sensing light through the invisible light-transmissive holes further comprises detecting motion in the vicinity of the pattern.

37. The method as claimed in claim 29 wherein sensing light through the invisible light-transmissive holes further comprises providing proximity detection by detecting motion in the vicinity of the pattern.

38. The method as claimed in claim 29 wherein sensing light through the invisible light-transmissive holes further comprises providing button emulation by detecting motion in the vicinity of the pattern.

39. An invisible, light-transmissive system, comprising:
a light resistant material; and
substantially invisible, tapered, light-transmissive holes penetrating in a light-transmissive pattern through the light resistant material, the holes having the characteristics of having been formed using a laser beam having a focal width less than the smallest diameter of the tapered holes.

40. The system as claimed in claim 39 wherein the substantially invisible, tapered, light-transmissive holes have the characteristics of having been formed by trepanning the tapered holes with the laser beam.

41. The system as claimed in claim 39 wherein the substantially invisible, tapered, light-transmissive holes have the characteristics of having been formed by trepanning the tapered holes by orbiting the laser beam around the edges of the holes.

42. The system as claimed in claim 39 wherein the substantially invisible, tapered, light-transmissive holes have the characteristics of having been formed by trepanning the tapered holes with the laser beam by:
- beginning penetrating the holes by orbiting the laser beam around the edges of the holes to describe the initial, largest hole diameter; and
- as each hole forms and deepens, tightening the orbit to progressively reduce the diameter of the orbit and of the hole.

43. The system as claimed in claim 39 wherein the substantially invisible, tapered, light-transmissive holes further comprise substantially conical holes.

44. The system as claimed in claim 39 wherein the substantially invisible, tapered, light-transmissive holes further comprise substantially symmetrical conical holes having an aspect ratio of about 0.33.

45. The system as claimed in claim 39 wherein the substantially invisible, tapered, light-transmissive holes further comprise substantially conical holes at least some of which are outwardly tilted with respect to the pattern.

46. The system as claimed in claim 39 wherein the substantially invisible, tapered, light-transmissive holes further comprise substantially conical holes at least some of which are outwardly tilted with respect to the pattern and have the characteristics of having been formed by trepanning with the laser beam.

47. The system as claimed in claim 39 wherein the substantially invisible, tapered, light-transmissive holes further comprise substantially conical holes at least some of which are inwardly tilted with respect to the pattern.

48. The system as claimed in claim 39 wherein the substantially invisible, tapered, light-transmissive holes further comprise substantially conical holes at least some of which are inwardly tilted with respect to the pattern and have the characteristics of having been formed by trepanning with the laser beam.

49. The system as claimed in claim 39 further comprising at least one invisible slot.

50. The system as claimed in claim 39 wherein the substantially invisible, tapered, light-transmissive holes have the characteristics of having been formed by melting the inner surfaces of the holes with the laser beam to form a smooth mirror finish thereon.

51. The system as claimed in claim 39 wherein the substantially invisible, tapered, light-transmissive holes have the characteristics of having been formed by penetrating using a laser beam having a focal width no larger than substantially half the smallest diameter of the tapered holes.

52. The system as claimed in claim 39 wherein the light resistant material further comprises a light resistant material having a textured surface.

53. The system as claimed in claim 39 wherein the a light resistant material further comprises a light resistant material having a textured surface in which the surface texture is substantially at least as large as the hole sizes at the textured surface.

54. The system as claimed in claim 39 further comprising a light-conductive filler filling the invisible tapered holes.

55. The system as claimed in claim 39 further comprising a light-conductive filler over-filling the invisible tapered holes to form a dome of filler on at least one end of each hole.

56. The system as claimed in claim 39 further comprising a light-conductive filler filling the invisible tapered holes and being finished at least one outer surface of the light resistant material.

57. The system as claimed in claim 39 further comprising a light-conductive, UV-cured polymeric filler filling the invisible tapered holes.

58. The system as claimed in claim 39 further comprising a light-conductive, UV-cured polymeric filler over-filling the invisible tapered holes to form a dome of filler on at least one end of each hole.

59. The system as claimed in claim 39 further comprising a light-conductive, UV-cured polymeric filler filling the invisible tapered holes and being finished at least one outer surface of the light resistant material.

60. An invisible, light-transmissive system, comprising:
- a light resistant material; and
- at least one substantially invisible light-transmissive slot penetrating in a light-transmissive pattern through the light resistant material.

61. The system as claimed in claim 60 wherein the substantially invisible light-transmissive slot has the characteristics of having been formed by trepanning the slot with a laser beam.

62. The system as claimed in claim 60 wherein the light resistant material further comprises a light resistant material having a textured surface.

63. The system as claimed in claim 60 further comprising a light-conductive filler filling the invisible light-transmissive slot.

64. The system as claimed in claim 60 further comprising a UV-cured light-conductive polymeric filler filling the invisible light-transmissive slot.

65. An invisible, light-transmissive system, comprising:
- a light resistant material;
- substantially invisible light-transmissive holes penetrating in a light-transmissive pattern through the light resistant material; and
- a light-sensitive receptor configured for sensing light through the invisible light-transmissive holes.

66. The system as claimed in claim 65 wherein the substantially invisible light-transmissive holes further comprise substantially tapered holes at least some of which are outwardly tilted with respect to the pattern.

67. The system as claimed in claim 65 wherein the substantially invisible light-transmissive holes further comprise substantially tapered holes at least some of which are outwardly tilted with respect to the pattern and have the characteristics of having been formed by trepanning with a laser beam.

68. The system as claimed in claim 65 wherein the substantially invisible light-transmissive holes further comprise substantially tapered holes at least some of which are inwardly tilted with respect to the pattern.

69. The system as claimed in claim 65 wherein the substantially invisible light-transmissive holes further comprise substantially tapered holes at least some of which are inwardly tilted with respect to the pattern and have the characteristics of having been formed by trepanning with a laser beam.

70. The system as claimed in claim 65 wherein the light-sensitive receptor is configured for sensing ambient light through the invisible light-transmissive holes.

71. The system as claimed in claim 65 wherein the light-sensitive receptor is configured for receiving IR control signals through the invisible light-transmissive holes.

72. The system as claimed in claim 65 wherein the light-sensitive receptor is configured for detecting motion in the vicinity of the pattern.

73. The system as claimed in claim 65 wherein the light-sensitive receptor is configured for providing proximity detection by detecting motion in the vicinity of the pattern.

74. The system as claimed in claim 65 wherein the light-sensitive receptor is configured for providing button emulation by detecting motion in the vicinity of the pattern.

* * * * *

UNITED STATES PATENT AND TRADEMARK OFFICE
CERTIFICATE OF CORRECTION

| | | |
|---|---|---|
| PATENT NO. | : 7,880,131 B2 | Page 1 of 1 |
| APPLICATION NO. | : 11/551988 | |
| DATED | : February 1, 2011 | |
| INVENTOR(S) | : Bartley K. Andre et al. | |

It is certified that error appears in the above-identified patent and that said Letters Patent is hereby corrected as shown below:

On the face page, in field (56), under "Other Publications", in column 2, line 1, delete "Tyrell" and insert -- Tyrrell --, therefor.

In column 3, line 20-21, after "the holes;" delete "for each of the holes;".

In column 15, line 65, delete "hithertofore" and insert -- heretofore --, therefor.

In column 19, line 57, in Claim 53, delete "the a" and insert -- the --, therefor.

In column 20, line 3, in Claim 56, delete "at least" and insert -- at at least --, therefor.

In column 20, line 16, in Claim 59, delete "at least" and insert -- at at least --, therefor.

Signed and Sealed this
Fifteenth Day of November, 2011

David J. Kappos
*Director of the United States Patent and Trademark Office*